US008699407B2

(12) United States Patent
Pang

(10) Patent No.: US 8,699,407 B2
(45) Date of Patent: Apr. 15, 2014

(54) METHOD AND APPARATUS FOR MIMO SCHEDULING

(75) Inventor: Di Pang, Hong Kong (HK)

(73) Assignee: Hong Kong Applied Science and Technology Research Institute Company Limited, Hong Kong Science Park Shatin, New Territories, Hong Kong (CN)

( * ) Notice: Subject to any disclaimer, the term of this patent is extended or adjusted under 35 U.S.C. 154(b) by 120 days.

(21) Appl. No.: 13/531,458

(22) Filed: Jun. 22, 2012

(65) Prior Publication Data

US 2013/0343289 A1  Dec. 26, 2013

(51) Int. Cl.
*H04W 4/00*    (2009.01)
*H04W 72/04*   (2009.01)

(52) U.S. Cl.
CPC ............................... *H04W 72/0446* (2013.01)
USPC ...... 370/326; 370/329; 370/335; 370/395.41; 370/449

(58) Field of Classification Search
None
See application file for complete search history.

(56) References Cited

U.S. PATENT DOCUMENTS

| | | | |
|---|---|---|---|
| 2008/0037671 A1* | 2/2008 | Lee et al. ...................... | 375/260 |
| 2008/0248753 A1* | 10/2008 | Chang et al. .................. | 455/63.1 |
| 2009/0034636 A1* | 2/2009 | Kotecha et al. ............... | 375/260 |
| 2009/0103497 A1* | 4/2009 | Fernandez-Corbaton et al. ............................ | 370/335 |
| 2009/0154419 A1* | 6/2009 | Yoshida et al. ............... | 370/330 |
| 2009/0279496 A1* | 11/2009 | Raissi-Dehkordi et al. .. | 370/329 |
| 2010/0135232 A1* | 6/2010 | Fan et al. ...................... | 370/329 |

OTHER PUBLICATIONS

Andrews, M. et al., "Providing Quality of Service over a Shared Wireless Link", IEEE Communications Magazine, p. 150-154, Feb. 2011.
Shakkottai, S. et al, "Cross-layer design for wireless networks", IEEE Communications Magazine, p. 74-80, Oct. 2003.
Kolding, T.E., "QoS-Aware Proportional Fair Packet Scheduling with Required Activity Detection", IEEE 64th Vehicular Technology Conference (VTC), 2006.

* cited by examiner

*Primary Examiner* — Jeffrey M Rutkowski
*Assistant Examiner* — Hardikkumar Patel
(74) *Attorney, Agent, or Firm* — Ella Cheong Hong Kong; Sam T. Yip

(57) ABSTRACT

This invention discloses a method and apparatus for scheduling radio resources among service flows for services supported in a MIMO-OFDM wireless communication system. Preferably a portion of radio resources for allocation is expressed as bandwidth or slots in different units. The method comprises a first stage and a second stage of scheduling. The first stage guarantees supporting minimum data rates for different services. The second stage aims to satisfy a requirement of not exceeding maximum data rates for different services as well as to optimize the spectrum efficiency. Each stage comprises: selecting a primary flow according to prioritization of service flows; allocating a portion of resources for the primary flow; selecting one or more secondary flows if there is resource remaining available, so as to optimize spectrum efficiency when transmitting with the primary flow in the same SDMA region; and allocating a portion of resources to each secondary flow.

20 Claims, 10 Drawing Sheets

METHOD AND APPARATUS FOR MIMO SCHEDULING

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates to scheduling radio resources for services supported in a wireless communication system using multi-input multi-output (MIMO) and orthogonal frequency division multiplexing (OFDM).

BACKGROUND

There is a huge demand for wireless data transmission. In particular, an increasing number of users and devices are going to use wireless networks for data transmission. With an increasing number of data-intensive multimedia applications in addition to speech-oriented communications, for example, Internet access, video conferencing, and video streaming, the amount of data transmitted over wireless channels increases tremendously at a rapid pace.

The MIMO transmission technique based on the use of multiple transmit antennas and multiple receive antennas provides a number of advantages such as an increased spectrum efficiency and enhanced transmitter reliability to cater for huge data-transmission demands. In a MIMO wireless communication system, both the transmitter and the receiver are equipped with multiple antennas. For radio communication standards such as the IEEE 802.16 m standard, both Single User MIMO (SU-MIMO) and Multi-User MIMO (MU-MIMO) are supported in the downlink (DL) as well as the uplink (UL). In other words, in addition to SU-MIMO where only one user is scheduled in one Resource Unit (RU), standards such as the IEEE 802.16 m standard allow multiple users to be scheduled in one RU when MU-MIMO is employed.

For MU-MIMO, data sent to different users are multiplexed into the same RU, giving rise to co-channel interference. Scheduling is of utmost importance because scheduling can suppress the impact of fading and interference occurred in wireless channels. Furthermore, scheduling can increase bandwidth utilization, guarantee various QoS (Quality of Service) requirements, and improve system fairness so that data rates can be guaranteed for various services. This type of scheduling is also known as MIMO scheduling.

A radio communication standard such as the IEEE 802.16 m standard provides a complicated QoS architecture. Under such QoS architecture, there are mainly six types of services, namely:

(1) aGP (adaptive Granting and Polling service), e.g., E-gaming;

(2) BE (Best Effort service), e.g., E-mail;

(3) nrtPS (non-real-time Polling Service), e.g., FTP (File Transfer Protocol);

(4) rtPS (real-time Polling Service), e.g., VOD (Video on Demand), net meeting;

(5) UGS (Unsolicited Grant Service), e.g., VOIP (Voice over Internet Protocol); and (6) ertPS (extended real-time Polling Service), e.g. VOIP with silence suppression.

These services are further classified into two categories: real-time applications and non-real-time applications. Non-real-time applications include nrtPS and BE, while real-time applications comprise rtPS, UGS, ertPS and aGP. For real-time applications, there are requirements on minimum data rates, maximum data rates, priority, and delay. For non-real-time applications, there are requirements on maximum data rates, minimum data rates, and priority, but delay is not a concern. In general, characteristics such as minimum data rates, maximum data rates, priority, and delay are known as QoS parameters.

Therefore, there is a need to maximize the system throughput and guarantee various QoS requirements by scheduling. However, some of the existing techniques focus on signaling processing but not on packet scheduling, for example, a technique disclosed in US20080248753A1. Some of the other existing techniques focus only on other objectives without maximizing the system throughput while guaranteeing QoS. For example, US20090034636A1 discloses a method for controlling feedback of preceding information in a MIMO communication system with an objective to reduce codebook feedback via a control mechanism.

There is also a need to satisfy up to four QoS parameters for the six above-mentioned services. However, some of the existing techniques focus on only a few of these QoS parameters or even none. For example, US20080037671A1 discloses a method and apparatus for wireless communications which selects a user based only on Channel Quality Information (CQI) and Channel State Information (CSI), but does not take into account the QoS parameters. Similar limitations are found in other techniques. M. Andrews, K. Kumaran, K. Ramanan, A. Stolyar, P. Whiting, *"Providing Quality of Service over a Shared Wireless Link"*, IEEE Communications Magazine, February, 2001, describe a modified largest weighted delay first (M-LWDF) scheduling algorithm and consider one QoS parameter only, i.e. delay, and the CQI. S. Shakkottai, T. S. Rappaport, P. C. Karlsson, *"Cross-layer design for wireless networks"*, IEEE Communications Magazine, December, 2003, describe an exponential queue length rule (EXP-Q) scheduling algorithm without considering any of the QoS parameters, instead focusing only on the traffic congestion and the channel capacity. This publication also describes an exponential waiting time rule (EXP-W) scheduling algorithm without considering any of the QoS parameters, only considering the waiting time of a packet in a queue and the channel capacity. T. E. Kolding, *"QoS-Aware Proportional Fair Packet Scheduling with Required Activity Detection"*, IEEE 64th Vehicular Technology Conference (VTC), 2006, describes a proportional fair with a barrier function scaling (PFB) scheduling algorithm whose key considerations are the minimum data rate and the proportional fair index, i.e. only one QoS parameter and the CQI. Similarly, US patent application US20090154419A1 also adopts the PFB scheduling algorithm and focuses on only one QoS parameter and the CQI. Furthermore, these existing techniques employ the same scheduling criterion for multiple spatial streams.

In particular, there is a need to provide scheduling in an MIMO-OFDM system. However, some of the existing techniques only focus on systems like a WCDMA system, for example, a technique disclosed in US20090103497A1.

Overall, there remains a need in the art for MIMO scheduling techniques which considers the QoS parameters such as delay, minimum data rate, maximum data rate, and priority, as well as CQI/CSI and traffic congestion, whilst satisfying the six service types as defined in the IEEE 802.16 m standard and providing different scheduling criteria for multiple spatial streams.

SUMMARY OF THE INVENTION

The present invention discloses a method for scheduling radio resources among service flows for services supported in a MIMO-OFDM wireless communication system. The resources comprise one or more spatial division multiple access (SDMA) regions The supported services comprise one or more of aGP, BE, nrtPS, rtPS, UGS and ertPS. Each of the supported services has a plurality of service flows. The scheduling method comprises a first stage of scheduling for a first set of services, and a second stage of scheduling for a second set of services if there is any resource remaining available after the first stage of scheduling. The first set of services are the supported services selected from UGS, ertPS, aGP, rtPS and nrtPS while the second set of services are the supported services selected from aGP, rtPS, nrtPS and BE.

The first stage of scheduling comprises resource scheduling for each of the supported services in the first service set. The resource scheduling for a service in the first service set comprises the following steps. A first primary flow is selected from the service flows of said service in the first service set, so as to guarantee a requirement of supporting minimum data rates, if there is any resource remaining available. In particular, selecting the first primary flow includes prioritizing the service flows of said service in the first service set. A portion of the resources for allocating to the first primary flow is then selected such that a requirement of supporting a minimum data rate for the first primary flow is guaranteed unless resources available are not sufficient to guarantee this requirement. If there is any resource remaining available, one or more first secondary flows are selected from the service flows of said service in the first service set, so as to optimize spectrum efficiency when transmitting with the first primary flow in a same SDMA region. A portion of the resources for allocating to each of the one or more first secondary flows is then determined such that a requirement of supporting a minimum data rate for each of the one or more first secondary flows is guaranteed unless resources available are not sufficient to guarantee this requirement.

The second stage of scheduling comprises resource scheduling for each of the supported services in the second service set. The resource scheduling for a service in the second service set comprises the following steps. A second primary flow is selected from the service flows of said service in the second service set if there is any resource remaining available. In particular, selecting the second primary flow includes prioritizing the service flows of said service in the second service set, so as to satisfy a requirement of not exceeding maximum data rates. A portion of the resources for allocating to the second primary flow is then selected such that a requirement of not exceeding a maximum data rate for the second primary flow is satisfied. If there is any resource remaining available, one or more second secondary flows are selected from the service flows of said service in the second service set, so as to optimize spectrum efficiency when transmitting with the second primary flow in a same SDMA region. A portion of the resources for allocating to each of the one or more second secondary flows is then determined such that a requirement of not exceeding a maximum data rate for each of the one or more second secondary flows is satisfied.

Preferably, a portion of the resources for allocating to a service flow is expressed as a bandwidth in the unit of bytes or as a number of slots.

Various formulas for identifying first primary flows, first secondary flows, second primary flow and second secondary flows, and for computing the bandwidth and the number of slots allocated to each of the aforesaid flows are provided in the present invention and elaborated in the specification.

The present invention also discloses an apparatus comprising one or more processors configured to schedule radio resources among service flows for services supported in a MIMO-OFDM wireless communication system according to the disclosed scheduling method.

DETAILED DESCRIPTION

Although embodiments of the present invention are described based on the IEEE 802.16 m standard as an example standard for illustration, the present invention disclosed herein is by no means limited only to this specification.

For convenience in illustration, herein in the specification and in the appended claims, a service-flow index is a number or a label assigned to a service flow in order to identify this service flow in a plurality of service flows. Furthermore, it is defined that an i th service flow, where i is a positive integer, has a service-flow index i.

Figure 1:
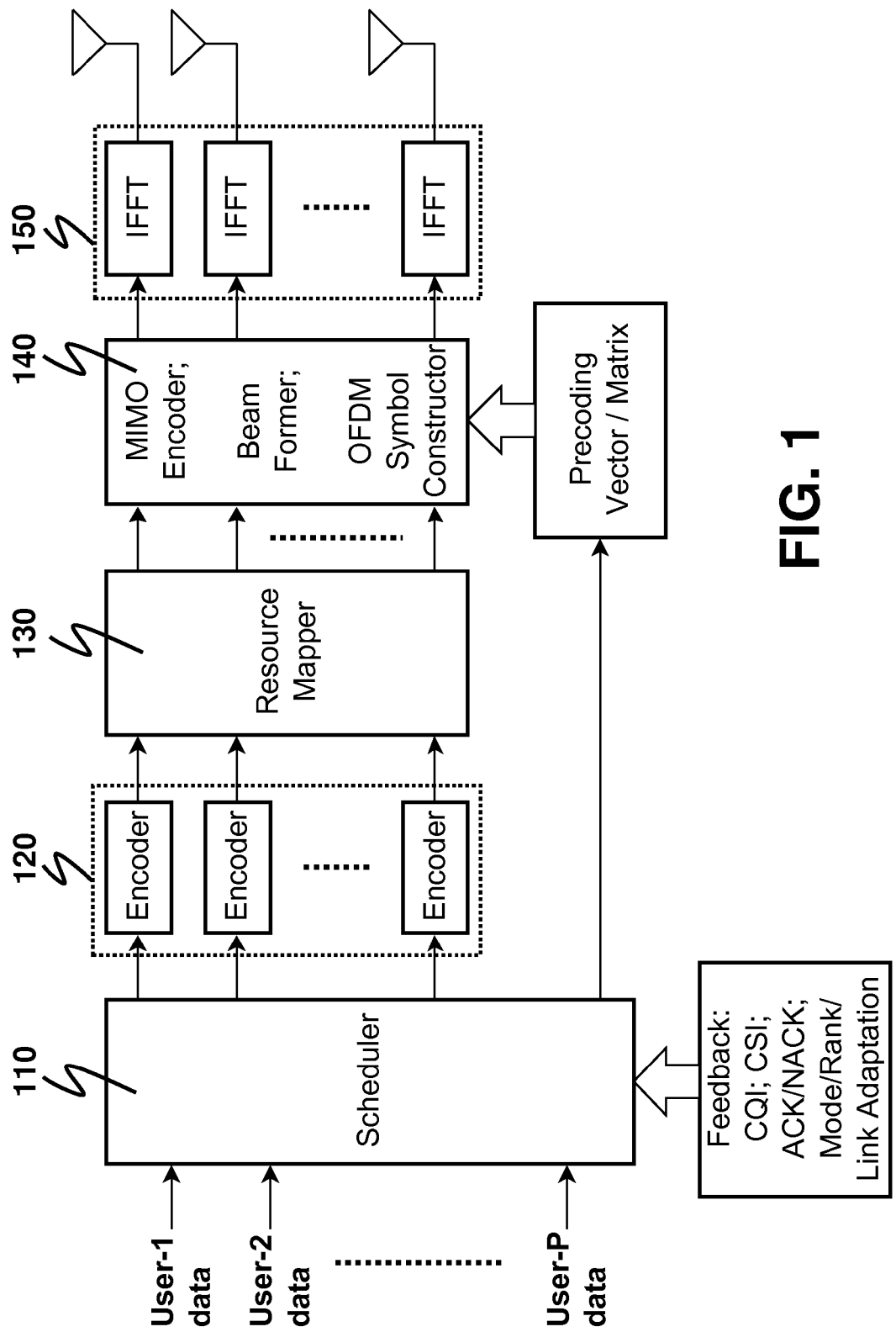
FIG. 1 depicts a block diagram of a MIMO-OFDM system in accordance with some embodiments of the present invention. The scheduler therein performs MIMO scheduling.

FIG. 1 depicts a block diagram showing an IEEE 802.16 m MIMO architecture in accordance with some embodiments of the present invention. The present invention is concerned with a scheduler 110, whose details and scheduling algorithms that are employed have not been defined in the IEEE 802.16 m standard. The scheduler 110 performs MIMO scheduling by scheduling radio resources among service flows (indicated as streams of user data in FIG. 1) for services supported in a MIMO-OFDM wireless communication system. In addition, MIMO scheduling performed by the scheduler 110 is based on information including various feedbacks, for example, channel quality information (CQI), channel state information (CSI), ACK/NACK indication, mode of MIMO operation, rank, and link adaption. After MIMO scheduling by the scheduler 110, the data of the service flows are forwarded to subsequent signal-processing units, such as encoders 120, a resource mapper 130, a unit 140 comprising a MIMO encoder, a beamformer and an OFDM constructor, and IFFT blocks 150. The output signals of the IFFT blocks 150 are transmitted over multiple antennas.

Since multiple antennas are used in the MIMO-OFDM system, allowing a number of data streams to be transmitted in parallel over the space, and since OFDM is used, allowing different data to be transmitted on different subcarriers of an OFDM signal, it follows that the radio resources include the number of supportable data streams and the number of subcarriers. The number of supportable data streams depends on the mode of MIMO operation. The radio resources further include the length of available transmission time. The length of available transmission time may be, for example, a time of a frame. Herein in the specification and in the appended claims, a spatial division multiple access (SDMA) region is referred to as a radio resource region characterized by the number of subcarriers, the number of supportable data streams and the length of available transmission time. A SDMA region may be visualized as a three-dimensional region having dimensions of frequency, time, and spatial stream. The radio resources comprise one or more SDMA regions.

Although the radio resources comprise one or more SDMA regions, it is convenient to use a notion of bandwidth in the unit of bytes, or a notion of slot in the unit of slots, to express a portion of the resources for allocation during scheduling. In a SISO (Single-Input Single-Output) system, a slot is a two dimensional time-frequency resource unit which consists of multiple sub-carriers and multiple OFDMA symbols. In a MIMO system, the radio resources consist of several SDMA regions which have three dimensions of frequency, time and spatial stream. In this case, the radio resources cannot be represented only by slots, but a combination of slots and spatial streams. The slot and the bandwidth can be converted to each other by EQNS. (15) and (16) shown in the specification. From a practical point of view, the scheduler 110 may perform scheduling by first determining which one of spatial streams can be used, or occupied, by a service flow followed by determining a bandwidth or a number of slots to be allocated for the service flow.

Figure 2:
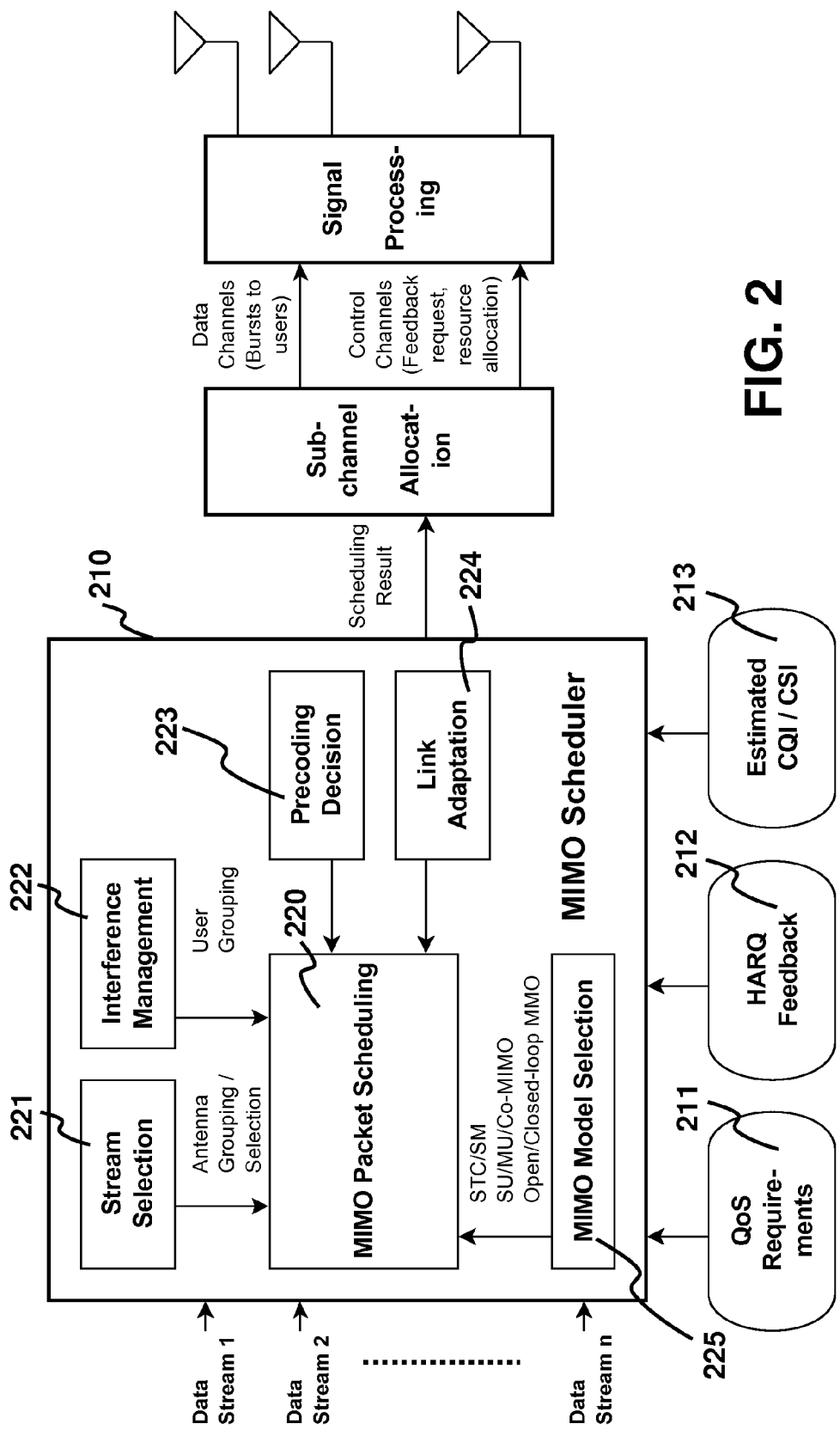
FIG. 2 depicts a block diagram of a MIMO scheduler architecture in accordance with some embodiments of the present invention.

FIG. 2 depicts a block diagram of a MIMO scheduler architecture in accordance with some embodiments of the present invention. In addition to QoS parameters as given by the QoS requirements 211, the MIMO scheduler 210 performs scheduling for n data streams for various users based on inputs such as HARQ feedback 212 and estimated CQI/CSI 213. The MIMO scheduler 210 includes computing resources such as processors and memories to implement various modules such as MIMO packet scheduling 220. The MIMO packet scheduling module 220 works with other modules including stream selection 221, interference management 222, precoding decision 223, link adaptation 224, and MIMO mode selection 225. The stream selection module 221 carries out antenna grouping as well as antenna selection for n data streams. The interference management module 222 determines how to group the users to minimize the interference among the users. The MIMO mode selection module 225 enables the MIMO packet scheduling module 220 to adapt to various MIMO modes such as STTD-MIMO (Space Time Transmit Diversity-MIMO), SM-MIMO (Spatial Multiplexing MIMO), SU-MIMO, MU-MIMO, Co-MIMO (Collaborative MIMO), open or closed-loop MIMO. The scheduling results from the MIMO scheduler 210 are used for subchannel allocation and other signal processing.

Figure 3:
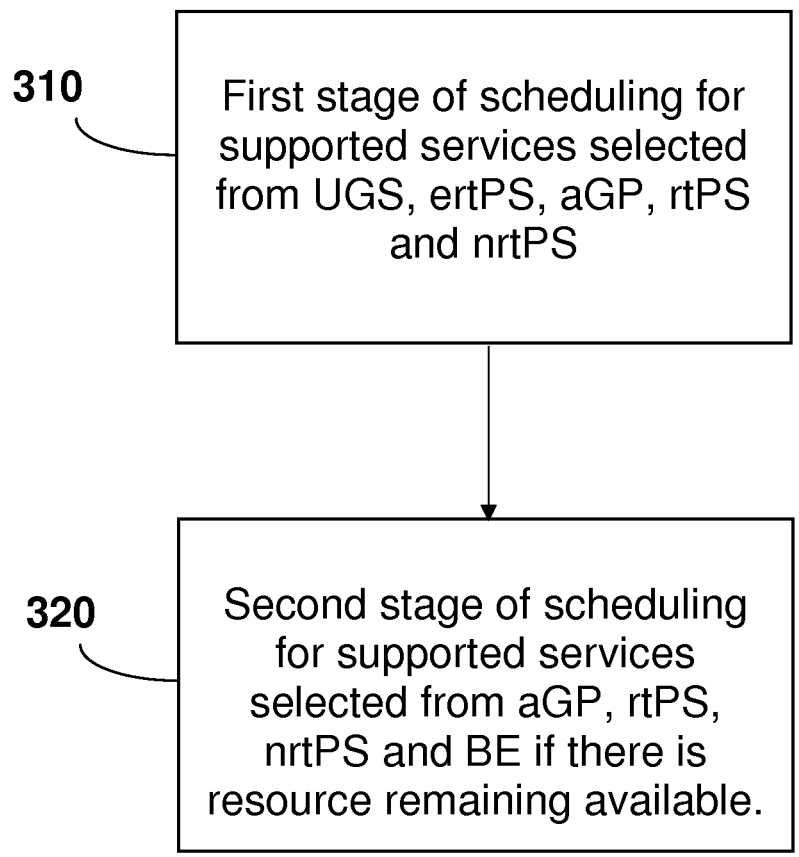
FIG. 3 depicts the steps of a scheduling method, which is an exemplary embodiment disclosed in the present invention. The scheduling method comprises a first stage and a second stage of scheduling.

An exemplary embodiment of the present invention is a method for scheduling radio resources among service flows for services supported in a MIMO-OFDM wireless communication system. The supported services comprise one or more of aGP, BE, nrtPS, rtPS, UGS and ertPS. Each of the supported services has a plurality of service flows. FIG. 3 illustrates the steps taken in the scheduling method. The scheduling method comprises a first stage of scheduling 310 and a second stage of scheduling 320. The second stage of scheduling 320 is performed if there is any resource remaining available after the first stage of scheduling 310 is done. In the first stage of scheduling 310, resource scheduling is performed for a first set of services that are the supported services selected from UGS, ertPS, aGP, rtPS and nrtPS. An objective of the first stage of scheduling 310 is to guarantee a QoS requirement of supporting minimum data rates for different services. Therefore, the first stage of scheduling 310 is applied to the supported services selected from UGS, ertPS, aGP, rtPS and nrtPS, all of which have the minimum data rate requirements. In the second stage of scheduling 320, resource scheduling is performed for a second set of services that are the supported services selected from aGP, rtPS, nrtPS and BE. An objective of the second stage of scheduling 320 is to satisfy a QoS requirement of not exceeding maximum data rates for different services as well as to optimize the spectrum efficiency. It follows that the second stage of scheduling 320 is applied to the supported services selected from aGP, rtPS, nrtPS and BE, all of which have the maximum data rate requirements.

Figure 4A:
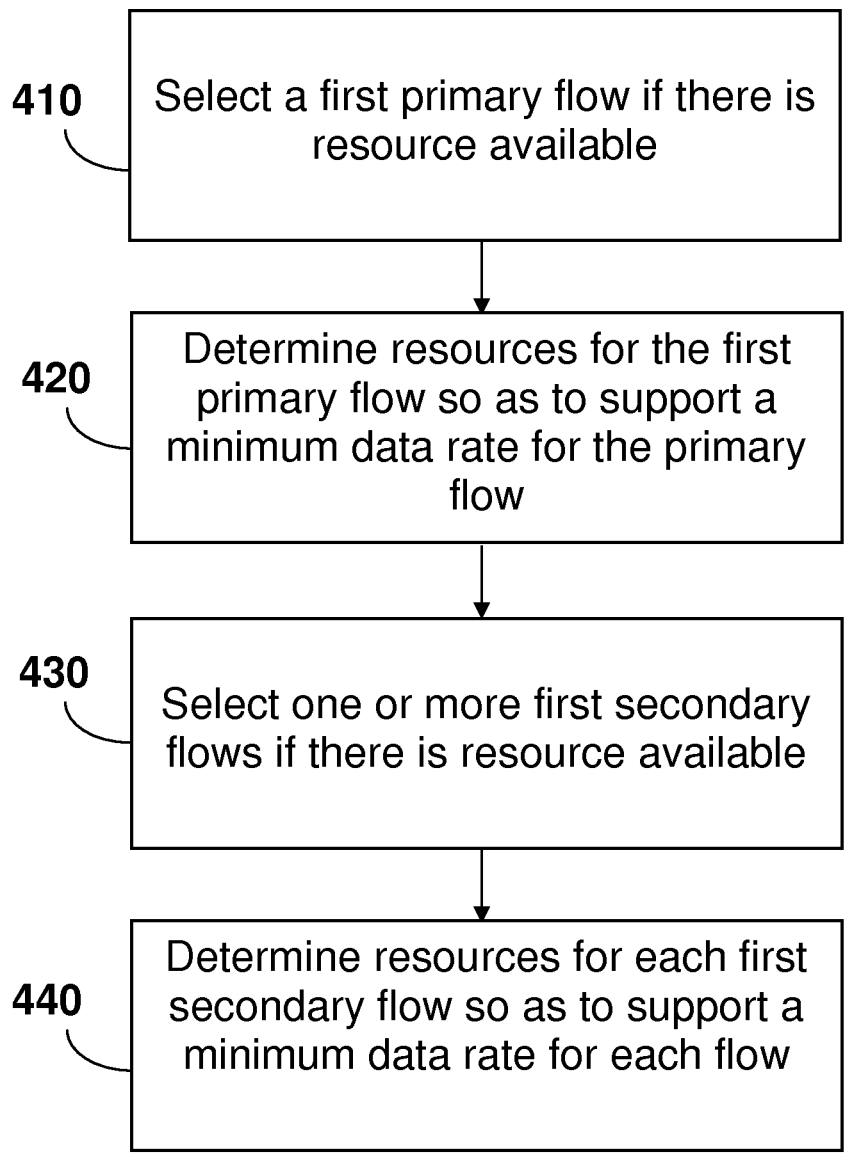
FIG. 4a illustrates the steps of resource scheduling for a service in the first stage of scheduling.

The first stage of scheduling 310 comprises resource scheduling for each of the supported services in the first service set. FIG. 4a illustrates the steps taken in the resource scheduling for a service in the first service set. This service is referred to as a target service for convenience in the following description.

In a first step 410, a first primary flow is selected from the service flows of the target service if there is any resource remaining available. In particular, the selecting of the first primary flow includes prioritization among the service flows of the target service. Preferably, the first primary flow is selected as a service flow having the highest priority according to a result of the prioritization, such that resources can be allocated to the service flow with the highest priority.

In a second step 420, a portion of resources for allocating to the first primary flow is determined. In particular, this portion of resources is so determined that a requirement of supporting a minimum data rate for the primary flow is guaranteed unless resources available are not sufficient to guarantee this requirement.

The first primary flow is a service flow that occupies a SDMA region in the first place. It is possible to multiplex additional service flows transmitted together with the first primary flow. These additional service flows occupy the same SDMA region as the first primary flow. An advantage of transmitting the first primary flow with these additional service flows is that the spectrum efficiency can be optimized. In a third step 430 of the resource scheduling for the target service, one or more first secondary flows are selected from the service flows of the target service if there is any resource remaining available. The one or more first secondary flows are selected so as to optimize spectrum efficiency when transmitting with the first primary flow in the same SDMA region.

In a fourth step 440, for each of the one or more first secondary flows, a portion of the resources is determined for allocating to such first secondary flow. This portion of resources is determined such that a requirement of supporting a minimum data rate for such first secondary flow is guaranteed unless resources available are not sufficient to guarantee this requirement.

Figure 4B:
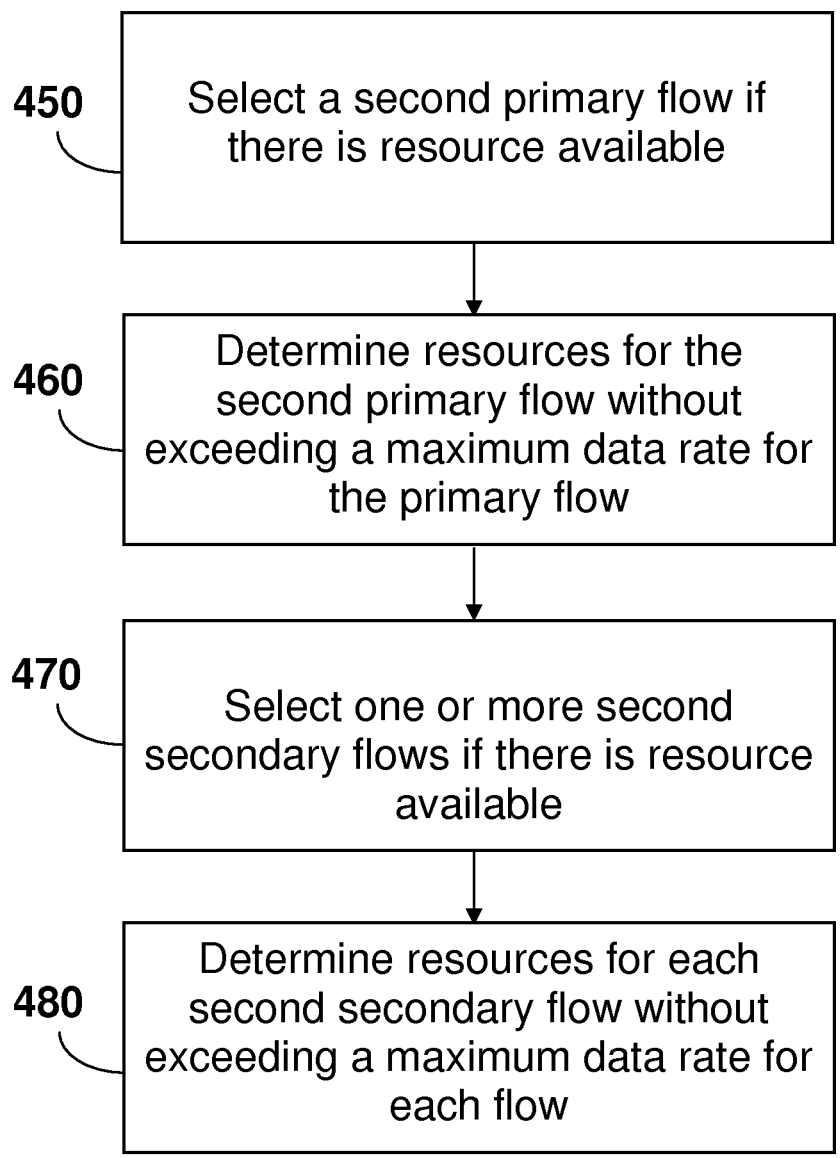
FIG. 4b illustrates the steps of resource scheduling for a service in the second stage of scheduling.

Similar to the first stage of scheduling 310, the second stage of scheduling 320 comprises resource scheduling for each of the supported services in the second service set. FIG. 4b illustrates the steps taken in the resource scheduling for a service in the second service set. For the sake of convenience, this service is referred to as a second target service in the following description.

In a first step 450 of the resource scheduling for the second target service, a second primary flow is selected from the service flows of the second target service if there is any resource remaining available. In particular, the selecting of the second primary flow includes prioritization among the service flows of the second target service. Preferably, the second primary flow is selected as a service flow having the highest priority according to a result of this prioritization, such that resources can be allocated to this service flow with the highest priority.

In a second step 460, a portion of resources for allocating to the second primary flow is determined. In particular, this portion of resources is so determined that a requirement of not exceeding a maximum data rate for the second primary flow is satisfied.

It is possible to multiplex additional service flows transmitted together with the second primary flow. As a result, these additional service flows occupy the same SDMA region as the second primary flow. An advantage of spectrum efficiency optimization is achieved by transmitting the second primary flow with these additional service flows. In a third step 470, one or more second secondary flows are selected from the service flows of the second target service if there is any resource remaining available. The one or more second secondary flows are selected so as to optimize spectrum efficiency when transmitting with the second primary flow in the same SDMA region.

In a fourth step 480, for each of the one or more second secondary flows, a portion of the resources is determined for allocating to such second secondary flow. This portion of resources is determined such that a requirement of not exceeding a maximum data rate for the second primary flow is satisfied.

As mentioned above, preferably a portion of the resources for allocating to a service flow is expressed as a bandwidth in the unit of bytes or as a number of slots.

Selection of the First Primary Flow

Preferably, the first primary flow is selected by identifying a service flow having a greatest product of a QoS-urgent-degree coefficient and a proportional fair index among service flows of a target service. An îth service flow of the target service is selected as the first primary flow according to EQNS. (1) and (3) below. Using EQN. (1) or EQN. (3) depends on whether the target service is a real-time service or a non-real-time one.

For real-time services, which include UGS, ertPS, aGP and rtPS, î is given by $$\hat{i} = \underset{i \in \{1,2,\ldots,L\}}{\mathrm{argmax}} \{p_1 \times p_2\} \quad \text{(EQN. 1)}$$

$$= \underset{i \in \{1,2,\ldots,L\}}{\mathrm{argmax}} \left\{ \frac{\varphi_i^q R_i^{min}}{pow(\lambda, T_a + D_i/\mu - T_c)} \times \frac{S(k,m)}{\theta_i(\Delta t)} \right\}$$

where:
L is the total number of service flows of the target service;
$p_1$ is the QoS-urgent-degree coefficient;
$p_2$ is the proportional fair index;
$\varphi_i^q$ is a packet queue length of the i th service flow;
$R_i^{min}$ is a minimum data rate requirement of the i th service flow;
$\lambda$ is a constant greater than 1;
$T_a$ is the frame number at which the last packet in the queue of the i th service flow arrives;
$T_c$ is the current frame number;
$D_i$ is a delay requirement of the i th service flow;
$\mu$ is the frame duration;
$(T_a + D_i/\mu - T_c)$ is a delay sensitivity degree of the i th service flow;
$pow(\lambda, b)$ is an ascending power function with a base $\lambda$ ($\lambda > 1$) and an exponent b, the result of $pow(\lambda, b)$ being equivalent to $\lambda^b$;
$S(k, m)$ is the supportable data rate per slot of a mobile station k in a stream m; and
$\theta_i(\Delta t)$ is an average throughput of the i th service flow in the latest $\Delta t$ frames.

EQN. (1) aims to achieve a tradeoff between the QoS-urgent-degree coefficient and the proportional fair index. The QoS-urgent-degree coefficient $p_1$ is proportional to a product of $\varphi_i^q$ and $R_i^{min}$, and is inversely proportional to $pow(\lambda, b)$ having a base $\lambda$ ($\lambda > 1$) and an exponent b. The exponent $(T_a + D_i/\mu - T_c)$ relates to the delay sensitivity of the i th service flow. The proportional fair index $p_2$ is proportional to $S(k,m)$ and is inversely proportional to $\theta_i(\Delta t)$. Therefore, a greater product of $p_1$ and $p_2$ leads to a higher priority for a service flow to be scheduled. Since real-time services are delay sensitive, $p_1$ is dependent on the delay sensitivity degree. Optionally, one may modify EQN. (1) to $$\hat{i} = \underset{i \in \{1,2,\ldots,L\}}{\mathrm{argmax}} \left\{ \frac{\varphi_i^q R_i^{min}}{pow(\lambda, T_a + D_i/\mu - T_c)} \times \frac{1}{\theta_i(\Delta t)} \right\} \quad \text{(EQN. 2)}$$

and employ EQN. (2) to evaluate î for real-time services so as to enjoy a potential advantage of reducing implementation complexity of the scheduler 110.

For non-real-time services, which include nrtPS, î is given by $$\hat{i} = \underset{i \in \{1,2,\ldots,L\}}{\mathrm{argmax}} \{p_1 \times p_2\} \quad \text{(EQN. 3)}$$

$$= \underset{i \in \{1,2,\ldots,L\}}{\mathrm{argmax}} \left\{ \frac{\varphi_i^q R_i^{min}}{pow(\lambda, T_a - T_c)} \times \frac{S(k,m)}{\theta_i(\Delta t)} \right\}.$$

Similarly, to reduce implementation complexity of the scheduler 110, it is optional to modify EQN. (3) to $$\hat{i} = \underset{i \in \{1,2,\ldots,L\}}{\mathrm{argmax}} \left\{ \frac{\varphi_i^q R_i^{min}}{pow(\lambda, T_a - T_c)} \times \frac{1}{\theta_i(\Delta t)} \right\} \quad \text{(EQN. 4)}$$

and use EQN. (4) to evaluate î for non-real-time services.

Selection of First Secondary Flows

As mentioned above, one or more first secondary flows are selected so as to optimize spectrum efficiency when transmitting with the first primary flow in the same SDMA region. Preferably, the one or more first secondary flows, if there is any resource remaining available, are selected according to the following approach.

Let $\Gamma_{\hat{i}}^{1st}$ be a number of slots allocated to the first primary flow selected as the $\hat{i}$ th service flow of the target service, and $\Gamma_{j}^{1st}$ be a number of slots allocated to a service flow denoted as the j th service flow. Details of computing $\Gamma_{\hat{i}}^{1st}$ and $\Gamma_{j}^{1st}$ will be elaborated later. To optimize the spectrum efficiency, it is desirable to select the j th service flow that makes the best use of the SDMA region by having $\Gamma_{j}^{1st}$ close to $\Gamma_{\hat{i}}^{1st}$.

Let A be a set of service-flow indices corresponding to service flows that are candidates for being selected as a first secondary flow. First, form a set $$Z^{1st} = \{j | \Gamma_{i}^{1st}, j \in A\}. \quad \text{(EQN. 5)}$$

Second, select a $\hat{j}$ th service flow as a first secondary flow according to $$\hat{j} = \begin{cases} \operatorname{argmin}_{j \in A}\{\Gamma_{\hat{i}}^{1st} - \Gamma_{j}^{1st}\} & \text{if } Z^{1st} \neq \phi \\ \operatorname{argmin}_{j \in A}\{\Gamma_{j}^{1st}\} & \text{if } Z^{1st} = \phi \end{cases} \quad \text{(EQN. 6)}$$

where $\phi$ denotes an empty set. After updating A by removing the service-flow index $\hat{j}$ therein, repeat these two steps for selecting another first secondary flow if there is any supportable data stream remaining available in the SDMA region.

Preferably, if the unitary precoding mechanism is used in a MIMO-OFDM wireless communication system employing MU-MIMO, the service flows sharing the same SDMA region are selected to be those with feedbacks corresponding to the different precoding vectors within the same precoding matrix, such that interferences among co-channel users are reduced.

Selection of the Second Primary Flow

Preferably, the second primary flow is selected by identifying a service flow having a greatest product of a QoS-urgent-degree coefficient and a proportional fair index among service flows of a second target service. An $\hat{i}$ th service flow of the second target service is selected as the second primary flow according to EQNS. (7) and (9) below. Using EQN. (7) or EQN. (9) depends on whether the second target service is a real-time service or a non-real-time one.

For real-time services, which include aGP and rtPS, $\hat{i}$ is given by $$\hat{i} = \operatorname*{argmax}_{i \in \{1,2,\ldots,L\}} \{p_1 \times p_2\} \quad \text{(EQN. 7)}$$

$$= \operatorname*{argmax}_{i \in \{1,2,\ldots,L\}} \left\{ \frac{\varphi_i^q R_i^{max}}{pow(\lambda, T_a + D_i/\mu - T_c)} \times \frac{S(k,m)}{\theta_i(\Delta t)} \right\}$$

where:
 L is the total number of service flows of the second target service; and
 $R_i^{max}$ is a maximum data rate requirement of the i th service flow.

EQN. (7) aims to achieve a tradeoff between the QoS-urgent-degree coefficient and the proportional fair index. The QoS-urgent-degree coefficient $p_1$ is proportional to a product of $\phi_i^q$ and $R_i^{max}$, and is inversely proportional to $pow(\lambda, b)$ having a base $\lambda$ ($\lambda > 1$) and an exponent b. The exponent ($T_a + D_i/\mu - T_c$) relates to the delay sensitivity of the i th service flow. The proportional fair index $p_2$ is proportional to $S(k,m)$ and is inversely proportional to $\theta_i(\Delta t)$. Therefore, a greater product of $p_1$ and $p_2$ leads to a higher priority for a service flow to be scheduled. Since real-time services are delay sensitive, $p_1$ is dependent on the delay sensitivity degree. Optionally, one can modify EQN. (7) to $$\hat{i} = \operatorname*{argmax}_{i \in \{1,2,\ldots,L\}} \left\{ \frac{\varphi_i^q R_i^{max}}{pow(\lambda, T_a + D_i/\mu - T_c)} \times \frac{1}{\theta_i(\Delta t)} \right\} \quad \text{(EQN. 8)}$$

and employ EQN. (8) to evaluate $\hat{i}$ for real-time services for a possible advantage of reducing implementation complexity of the scheduler 110.

For non-real-time services, which include nrtPS and BE, $\hat{i}$ is given by $$\hat{i} = \operatorname*{argmax}_{i \in \{1,2,\ldots,L\}} \{p_1 \times p_2\} \quad \text{(EQN. 9)}$$

$$= \operatorname*{argmax}_{i \in \{1,2,\ldots,L\}} \left\{ \frac{\varphi_i^q R_i^{max}}{pow(\lambda, T_a - T_c)} \times \frac{1}{\theta_i(\Delta t)} \right\}.$$

Similarly, to reduce implementation complexity of the scheduler 110, it is optional to modify EQN. (9) to $$\hat{i} = \operatorname*{argmax}_{i \in \{1,2,\ldots,L\}} \left\{ \frac{\varphi_i^q R_i^{max}}{pow(\lambda, T_a - T_c)} \times \frac{1}{\theta_i(\Delta t)} \right\} \quad \text{(EQN. 10)}$$

and use EQN. (10) to evaluate $\hat{i}$ for non-real-time services.

Selection of Second Secondary Flows

As mentioned above, one or more second secondary flows are selected so as to optimize spectrum efficiency when transmitting with the second primary flow in the same SDMA region. Preferably, the one or more second secondary flows, if there is any resource remaining available, are selected according to the following approach.

Let $\Gamma_{\hat{i}}^{2nd}$ be a number of slots allocated to the second primary flow selected as the $\hat{i}$ th service flow of the second target service, and $\Gamma_{j}^{2nd}$ be a number of slots allocated to a service flow denoted as the j th service flow. Details of computing $\Gamma_{\hat{i}}^{2nd}$ and $\Gamma_{j}^{2nd}$ will be elaborated later. To optimize the spectrum efficiency, it is desirable to select the j th service flow that makes the best use of the SDMA region by having $\Gamma_{j}^{2nd}$ close to $\Gamma_{\hat{i}}^{2nd}$.

Let B be a set of service-flow indices corresponding to service flows that are candidates for being selected as a first secondary flow. First, form a set $$Z^{2nd} = \{j | \Gamma_{\hat{i}}^{2nd} \geq \Gamma_{j}^{2nd}, j \in B\}. \quad \text{(EQN. 11)}$$

Second, select a $\hat{j}$ th service flow as a first secondary flow according to $$\hat{j} = \begin{cases} \operatorname{argmin}_{j \in B}\{\Gamma_{\hat{i}}^{2nd} - \Gamma_{j}^{2nd}\} & \text{if } Z^{2nd} \neq \phi \\ \operatorname{argmin}_{j \in B}\{\Gamma_{j}^{2nd}\} & \text{if } Z^{2nd} = \phi. \end{cases} \quad \text{(EQN. 12)}$$

After updating B by removing the service-flow index $\hat{j}$ therein, repeat these two steps for selecting another second secondary flow if there is any supportable data stream remaining available in the SDMA region.

Preferably, if the unitary precoding mechanism is used in a MIMO-OFDM wireless communication system employing MU-MIMO, the service flows sharing the same SDMA region are selected to be those with feedbacks corresponding to the different precoding vectors within the same precoding matrix, such that interferences among co-channel users are reduced.

Bandwidth Allocation

Bandwidth allocation strategies for the first stage and for the second stage of scheduling are performed in accordance with QoS parameters of the target service and of the second target service, respectively. In one embodiment, the bandwidth allocation strategies for the six types of services are detailed in Table 1 below.

TABLE 1

| Service type | Bandwidth Allocation Strategy |
|---|---|
| UGS | Drop packets if time out |
| ertPS | $\phi_l^{1st} = \phi_l^{min} = \phi_l^{max} = \min\{\phi_l^{b-min},\phi_l^q,\phi_l^r\}$ |
| aGP | Drop packets if time out |
|  | If $R_l^{min} = R_l^{max}$, |
|  | $\phi_l^{1st} = \phi_l^{min} = \phi_l^{max} = \min\{\phi_l^{b-min},\phi_l^q,\phi_l^r\}$, and |
|  | $\phi_l^{2nd} = 0$ |
|  | If $R_l^{min} \neq R_l^{max}$, |
|  | $\phi_l^{1st} = \phi_l^{min} = \min\{\phi_l^{b-min},\phi_l^q,\phi_l^r\}$, and |
|  | $\phi_l^{2nd} = \phi_l^{max} = \min\{\phi_l^{b-min} - \phi_l^{1st},\phi_l^r,\phi_l^q\}$ |
| rtPS | Drop packets if time out |
|  | $\phi_l^{1st} = \phi_l^{min} = \min\{\phi_l^{b-min},\phi_l^q,\phi_l^r\}$, and |
|  | $\phi_l^{2nd} = \phi_l^{max} = \min\{\phi_l^{b-min} - \phi_l^{1st},\phi_l^r,\phi_l^q\}$ |
| nrtPS | Not necessary to check time stamps; bandwidth allocation strategy the same as rtPS |
| BE | Only guarantee not to exceed $R_l^{max}$ |
|  | $\phi_l^{2nd} = \phi_l^{max} = \min\{\phi_l^{b-min},\phi_l^r,\phi_l^q\}$ |

In Table 1:

$\phi_l^{1st}$ is the amount of bandwidth allocated in the first stage of scheduling when scheduling the l th service flow;

$\phi_l^{2nd}$ is the amount of bandwidth allocated in the second stage of scheduling when scheduling the l th service flow;

$\phi_l^q$ is the packet queue length of the l th service flow;

$\phi_l^r$ is the remaining bandwidth in a frame when scheduling the l th service flow;

$\phi_l^{b-min}$ the average upper-bound of bandwidth calculated according to a minimum data rate requirement when scheduling the l th service flow;

$\phi_l^{b-max}$ is the average upper-bound of bandwidth calculated according to a maximum data rate requirement when scheduling the l th service flow;

$\phi_l^{min}$ the amount of bandwidth which should be allocated according to a minimum data rate requirement when scheduling the l th service flow; and $\phi_l^{max}$ is the amount of bandwidth which should be allocated according to a maximum data rate requirement when scheduling the l th service flow.

The calculated average upper-bounds of bandwidth $\phi_l^{b-min}$ and $\phi_l^{b-max}$ are computed by EQN. (13) and (14), respectively, according to QoS parameters, and are measured on a sliding window with a time window $\Delta T_w$:

$$\phi_l^{b-min} = \Delta T_w \mu R_l^{min} - \phi_l^a \qquad \text{EQN. (13)}$$

and $$\phi_l^{b-max} = \Delta T_w \mu R_l^{max} - \phi_l^a \qquad \text{EQN. (14)}$$

where:

$\Delta T_w$ is the window length of the sliding window for measuring the average upper-bound of bandwidth;

$\mu$ is the frame duration; and $\phi_l^a$ is the bandwidth that has been allocated during the previous $\Delta T_w - 1$ frames in the sliding window.

For both UGS and ertPS, the same bandwidth allocation strategy is adopted. When a given period of time has lapsed, packets will be dropped. The amount of bandwidth allocated in the first stage of scheduling when scheduling the l th service flow is determined to be equal to the amount of bandwidth allocated according to the minimum data rate requirement when scheduling the l th service flow ($\phi_l^{min}$), and the amount of bandwidth allocated according to the maximum data rate requirement when scheduling the l th service flow ($\phi_l^{max}$). This is equal to selecting the minimum among the three parameters including the packet queue length of the l th service flow ($\phi_l^q$), the remaining bandwidth in a frame when scheduling the l th service flow ($\phi_l^r$), and the average upper-bound of bandwidth calculated according to the minimum data rate requirement when scheduling the l th service flow ($\phi_l^{b-min}$).

For aGP, when a given period of time has lapsed, packets will be dropped and there are two different scenarios in the determination of the bandwidth allocation strategy. First, when the minimum data rate requirement of the l th service flow ($R_l^{min}$) is equal to the maximum data rate requirement of the l th service flow ($R_l^{max}$), the amount of bandwidth allocated in the first stage when scheduling the l th service flow is determined to be equal to the amount of bandwidth allocated according to the minimum data rate requirement when scheduling the l th service flow ($\phi_l^{min}$) and the amount of bandwidth allocated according to the maximum data rate requirement when scheduling the l th service flow ($\phi_l^{max}$). This is equal to selecting the minimum among the three parameters including the packet queue length of the l th service flow ($\phi_l^q$), the remaining bandwidth in a frame when scheduling the l th service flow ($\phi_l^r$), and the average upper-bound of bandwidth calculated according to the minimum data rate requirement when scheduling the l th service flow ($\phi_l^{b-min}$). The bandwidth allocation for the second stage is determined to be zero.

Second, when the minimum data rate requirement of the l th service flow ($R_l^{min}$) is different from the maximum data rate requirement of the l th service flow ($R_l^{max}$), the amount of bandwidth allocated in the first stage when scheduling the l th service flow ($\phi_l^{1st}$) is determined to be equal to the amount of bandwidth allocated according to the minimum data rate requirement when scheduling the l th service flow ($\phi_l^{min}$). This is equal to the minimum among the three parameters including the packet queue length of the l th service flow ($\phi_l^q$), the remaining bandwidth in a frame when scheduling the l th service flow ($\phi_l^r$), and the average upper-bound of bandwidth calculated according to the minimum data rate requirement when scheduling the l th service flow ($\phi_l^{b-min}$). The amount of bandwidth allocated in the second stage when scheduling the l th service flow ($\phi_l^{2nd}$) is determined to be equal to the amount of bandwidth allocated according to the maximum data rate requirement when scheduling the l th service flow ($\phi_l^{max}$). This is equal to selecting the minimum among the three parameters including the packet queue length of the l th service flow ($\phi_l^q$), the remaining bandwidth in a frame when scheduling the l th service flow ($\phi_l^r$), and the difference between the average upper-bound of bandwidth calculated according to the maximum data rate requirement when scheduling the l th service flow ($\phi_l^{b-max}$) and the amount of bandwidth allocated in the first stage scheduling when scheduling the l th service flow ($\phi_l^{1st}$).

For rtPS and nrtPS, the same bandwidth allocation strategy is adopted. When a given period of time has lapsed, packets will be dropped. In addition, it is not necessary for nrtPS to check time stamps. The amount of bandwidth allocated in the first stage when scheduling the l th service flow ($\phi_l^{1st}$) is determined to be equal to the amount of bandwidth allocated according to the minimum data rate requirement when scheduling the l th service flow ($\phi_l^{min}$). This is equal to the minimum among the three parameters including the packet queue length of the l th service flow ($\phi_l^q$), the remaining bandwidth in a frame when scheduling the l th service flow ($\phi_l^r$), and the average upper-bound of bandwidth calculated according to the minimum data rate requirement when scheduling the t th service flow ($\phi_l^{b-min}$). The amount of bandwidth allocated in the second stage when scheduling the l th service flow ($\phi_l^{2nd}$) is determined to be equal to the amount of bandwidth allocated according to the maximum data rate requirement when scheduling the l th service flow ($\phi_l^{max}$). This is equal to selecting the minimum among the three parameters including the packet queue length of the l th service flow ($\phi_l^q$), the remaining bandwidth in a frame when scheduling the l th service flow ($\phi_l^r$), and the difference between the average upper-bound of bandwidth calculated according to the maximum data rate requirement when scheduling the l th service flow ($\phi_l^{b-max}$) and the amount of bandwidth allocated in the first stage scheduling when scheduling the l th service flow ($\phi_l^{1st}$).

For BE, the bandwidth allocation strategy is to guarantee the bandwidth not to exceed the maximum data rate requirement of the l th service flow ($R_l^{max}$). The amount of bandwidth allocated in the second stage when scheduling the l th service flow ($\phi_l^{2nd}$) is determined to be equal to the amount of bandwidth allocated according to the maximum data rate requirement when scheduling the l th service flow ($\phi_l^{max}$). This is equal to selecting the minimum among the three parameters including the packet queue length of the l th service flow ($\phi_l^q$), the remaining bandwidth in a frame when scheduling the l th service flow ($\phi_l^r$), and the average upper-bound of bandwidth calculated according to the maximum data rate requirement when scheduling the l th service flow ($\phi_l^{b-max}$).

Slot Allocation

Slot allocation depends on the results of bandwidth allocation and MIMO mode selection. A service flow is able to occupy more than one data stream. The numbers of slots allocated to an l th service flow in the first stage of scheduling ($\Gamma_l^{1st}$) and in the second stage of scheduling ($\Gamma_l^{2nd}$) are computed by $$\Gamma_l^{1st} = \left[ \varphi_l^{1st} \bigg/ \sum_{m=1}^{U(S(k,m),N_{k,r})} (k,m) \right] \quad \text{(EQN. 15)}$$

and $$\Gamma_l^{2nd} = \left[ \varphi_l^{2nd} \bigg/ \sum_{m=1}^{U(S(k,m),N_{k,r})} (k,m) \right], \quad \text{(EQN. 16)}$$

respectively, where:
- $N_{k,r}$ is the number of receiver antennas at k th mobile station;
- $S(k,m)$ is the supportable data rate per slot of the k th mobile station in the m th data stream; and
- $U(S(k,m),N_{k,r})$ is a function of MIMO mode selection determining the switch among spatial multiplexing, transmit diversity, single antenna.

EXAMPLES

Figure 5:
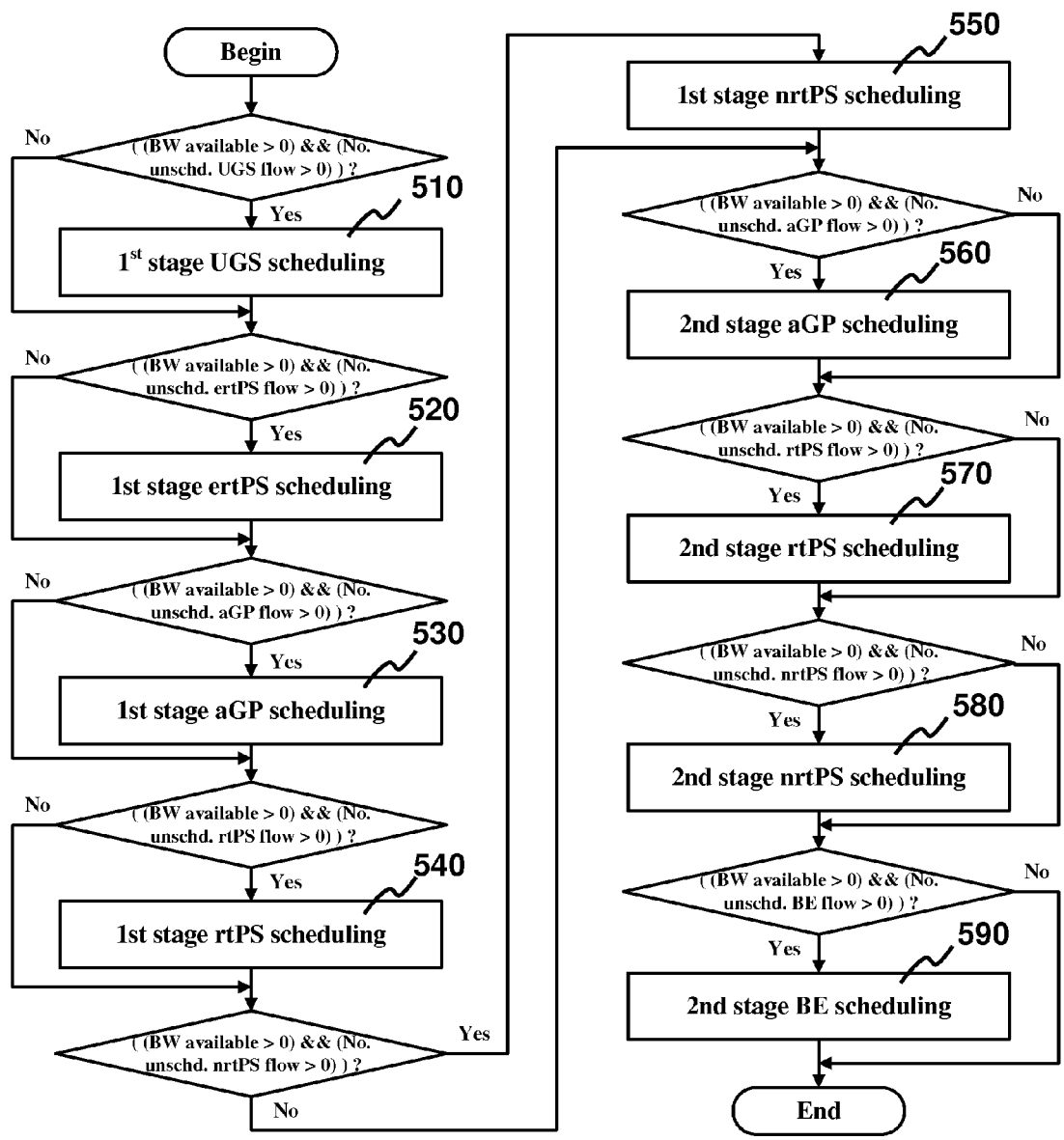
FIG. 5 depicts an example flowchart for scheduling service flows in two stages according to some embodiments of the present invention.

FIG. 5 shows a first example and depicts a flowchart for scheduling service flows in two stages according to some embodiments of the present invention. As described above, the present invention provides two stages in which the first stage guarantees the minimum data rate and the second stage improves the bandwidth efficiency and ensures that the actual rate does not exceed the maximum data rate. After determining the amount of bandwidth (in units of bytes) that remains available in the current radio frame, the service type of each of the n service flows and the number of unscheduled service flows are required to be known. The n service flows are scheduled such that the data rate r of each service flow is greater than or equal to the minimum data rate according to MIMO scheduling of each of the n service flows in the first stage scheduling. Since UGS, ertPS, aGP, rtPS, nrtPS have the minimum data rate requirements, any service flow with either of these scheduling services needs to go through the first stage scheduling. Consequently, as long as the bandwidth remains available for scheduling the service flows and there are still unscheduled service flows in storage awaiting scheduling, the first stage scheduling will be carried out for each unscheduled service flow, for example, the first stage UGS scheduling 510, the first stage ertPS scheduling 520, the first stage aGP scheduling 530, the first stage rtPS scheduling 540, and the first stage nrtPS scheduling 550. The present invention thus provides the scheduling results in terms of the number of slots and the amount of bandwidth (in units of bytes) required by each service flow for each current radio frame.

Since aGP, rtPS, nrtPS and BE have the maximum data rate requirements, any service flow with these scheduling services needs to go through the second stage scheduling. Consequently, as long as the bandwidth remains available for scheduling the service flows and there are still unscheduled service flows in storage awaiting scheduling, the second stage scheduling will be carried out for each unscheduled service flow, for example, the second stage aGP scheduling 560, the second stage rtPS scheduling 570, the second stage nrtPS scheduling 580, and the second stage BE scheduling 590.

Figure 6:
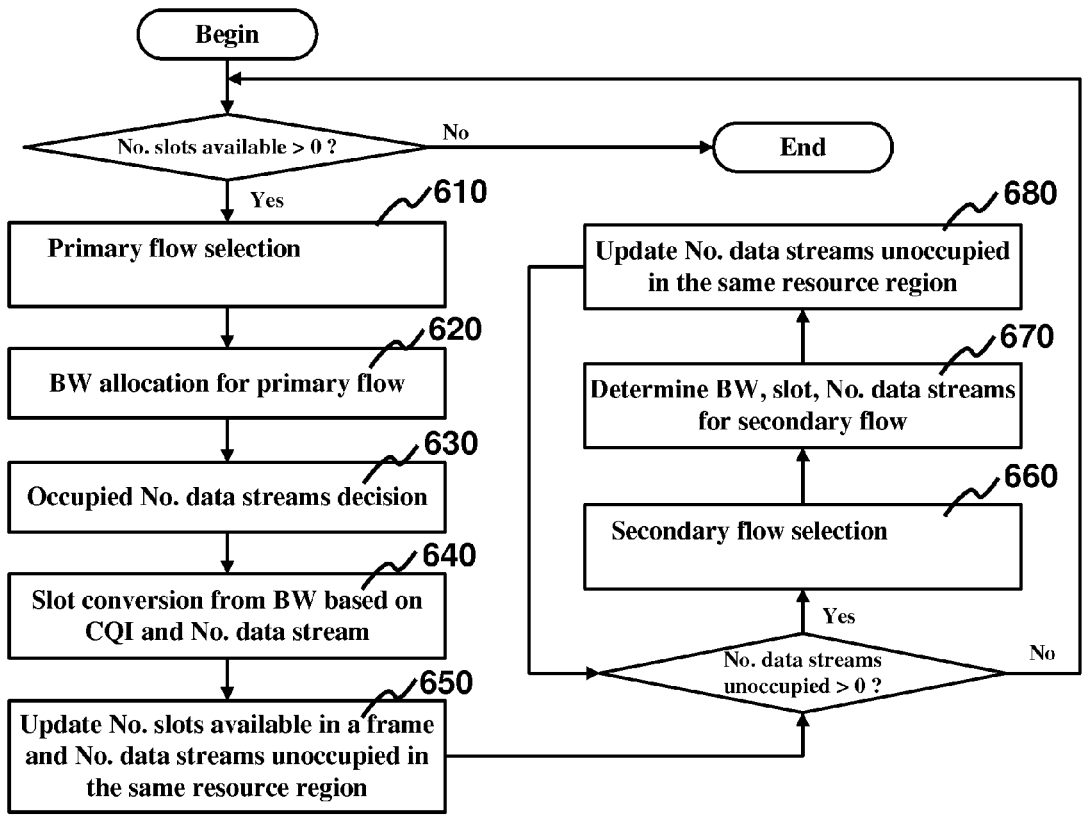
FIG. 6 depicts a flowchart for scheduling a service according to some embodiments of the present invention.

FIG. 6 shows another example and depicts a flowchart for scheduling a service according to some embodiments of the present invention. Scheduling of a service is implemented on a frame-by-frame basis.

To schedule a service, the QoS requirements of the service are required to be taken into consideration, such as delay, minimum data rate and maximum data rate. Other parameters such as channel quality information (CQI), channel state information (CSI) and traffic congestion are also required. For each radio frame, scheduling of a service is performed when free slots remain available by checking if the number of available slots is greater than zero. If there are one or more slots available in the radio frame, the service will be scheduled as follows.

First, a (first or second) primary flow is selected in the primary flow selection module 610. After the primary flow is determined, bandwidth allocation is performed for the primary flow in a bandwidth allocation module 620. The number of occupied data streams is decided in an occupied data streams decision module 630, depending on the number of antennas in the UL reception of users. Based on the number of occupied data streams as well as the CQI, slot conversion from bandwidth is performed in a slot conversion module 640 in accordance with EQNS. (15) or (16) for the first primary flow or the second primary flow, respectively. Subsequently, in a first update module 650, both the number of slots available in a frame and the number of unoccupied data streams in the same resource region are updated.

As long as there remains one or more unoccupied data streams in the same resource region (i.e. SDMA region) by checking if the number of the unoccupied data streams is greater than zero, a (first or second) secondary flow is selected in the secondary flow selection module 660. For each secondary flow, bandwidth allocation and slot allocation are performed and the number of data streams to be occupied is determined in a processing module 670. Subsequently, in a second update module 680, the number of unoccupied data streams in the same resource region is updated. After updating, if there are still unoccupied data streams left, the secondary flow selection is repeated along with bandwidth allocation as well as slot allocation for the secondary flow.

When no more unoccupied data streams are available, the whole process starting from the primary flow selection 610 is repeated unless there are no more slots available. When the scheduling of a service is complete, the scheduling results are provided in terms of the number of slots and the amount of bandwidth (in units of bytes) for a specific scheduling service per radio frame.

The following demonstrates the use of the present invention to schedule different types of services such as rtPS and BE in accordance with certain embodiments of the present invention.

Figure 7:
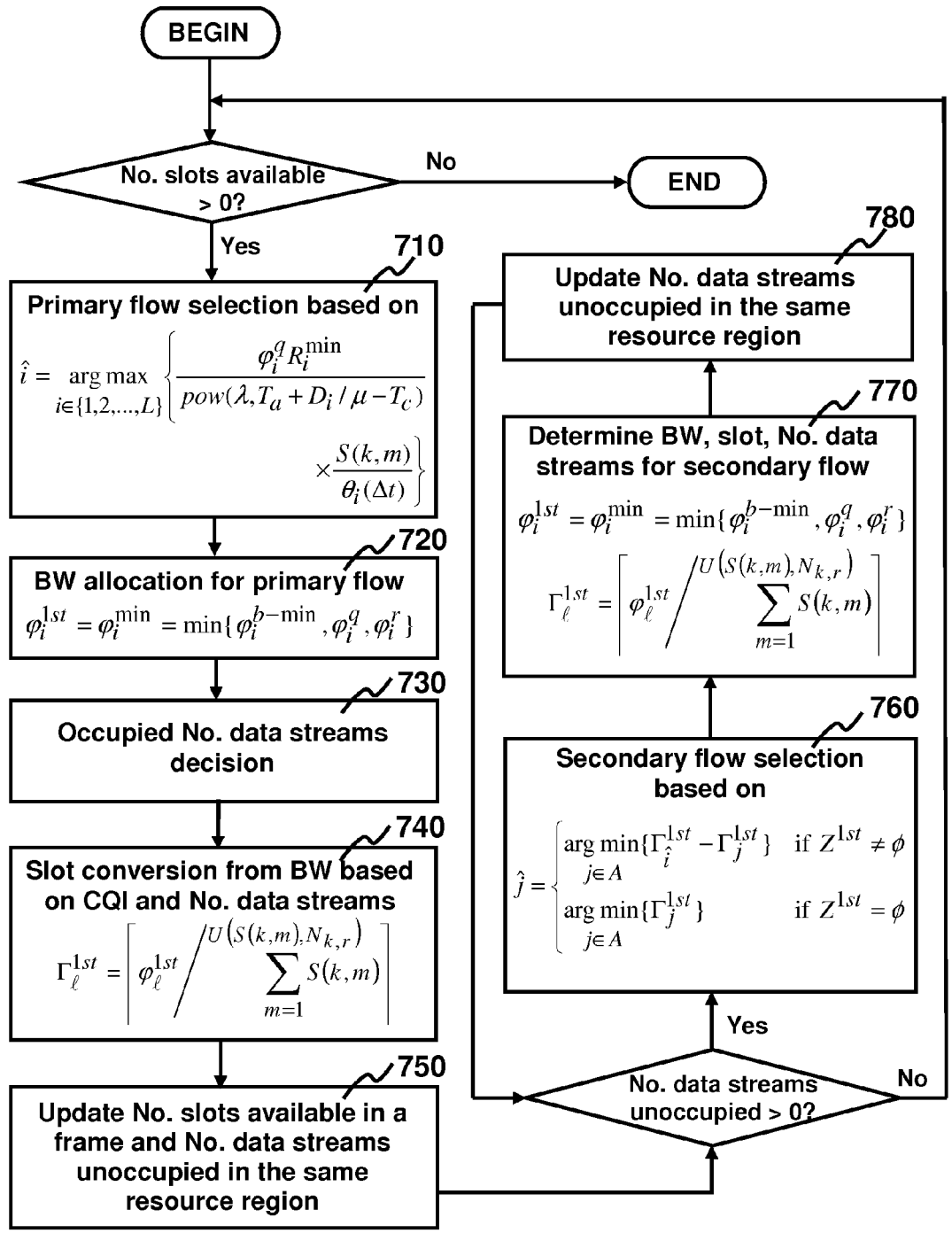
FIG. 7 depicts an example flowchart for scheduling rtPS flows in the first stage according to some embodiments of the present invention

For rtPS, there are two stages. FIG. 7 depicts an example flowchart for scheduling rtPS flows in the first stage according to some embodiments of the present invention. For each radio frame, scheduling of a service is performed when free slots remain available by checking if the number of available slots is greater than zero. If there are one or more slots available in the radio frame, the service will be scheduled as follows.

First, a first primary flow is selected in the primary flow selection module 710 according to EQN. (1):

$$\hat{i} = \underset{i \in \{1,2,\ldots,L\}}{\operatorname{argmax}} \left\{ \frac{\varphi_i^q R_i^{min}}{pow(\lambda, T_a + D_i/\mu - T_c)} \times \frac{S(k,m)}{\theta_i(\Delta t)} \right\}.$$

After the first primary flow is determined, bandwidth allocation in accordance with $\phi_i^{1st} = \phi_i^{min} = \min\{\phi_i^{b\text{-}min}, \phi_i^q, \phi_i^r\}$ is performed for the first primary flow in a bandwidth allocation module 720. The number of occupied data streams is decided in an occupied data streams decision module 730, depending on the number of antennas in the UL reception of users. Based on the number of occupied data streams as well as the CQI, slot conversion from bandwidth is performed in a slot conversion module 740 according to the EQN. (15):

$$\Gamma_\ell^{1st} = \left\lceil \varphi_\ell^{1st} / \sum_{m=1}^{U(S(k,m),N_{k,r})} S(k,m) \right\rceil.$$

Subsequently, in a first update module 750, both the number of slots available in a frame and the number of unoccupied data streams in the same resource region are updated.

As long as there remains one or more unoccupied data streams in the same resource region by checking if the number of the unoccupied data streams is greater than zero, a first secondary flow is selected in the secondary flow selection module 760 according to EQN. (6):

$$\hat{j} = \begin{cases} \underset{j \in A}{\operatorname{argmin}}\{\Gamma_i^{1st} - \Gamma_j^{1st}\} & \text{if } Z^{1st} \neq \phi \\ \underset{j \in A}{\operatorname{argmin}}\{\Gamma_j^{1st}\} & \text{if } Z^{1st} = \phi. \end{cases}$$

For each first secondary flow, bandwidth allocation is performed according to $\phi_i^{1st} = \phi_i^{min} = \min\{\phi_i^{b\text{-}min}, \phi_i^q, \phi_i^r\}$ and slot allocation is performed according to EQN. (15), $$\Gamma_\ell^{1st} = \left\lceil \varphi_\ell^{1st} / \sum_{m=1}^{U(S(k,m),N_{k,r})} S(k,m) \right\rceil,$$

and the number of data streams to be occupied is determined in a processing module 770. Subsequently, in a second update module 780, the number of unoccupied data streams in the same resource region is updated. After updating, if unoccupied data streams still remain, the secondary flow selection is repeated along with bandwidth allocation as well as slot allocation for the first secondary flow.

When no more unoccupied data streams are available, the whole process starting from the primary flow selection 710 is repeated unless there are no more slots available.

Figure 8:
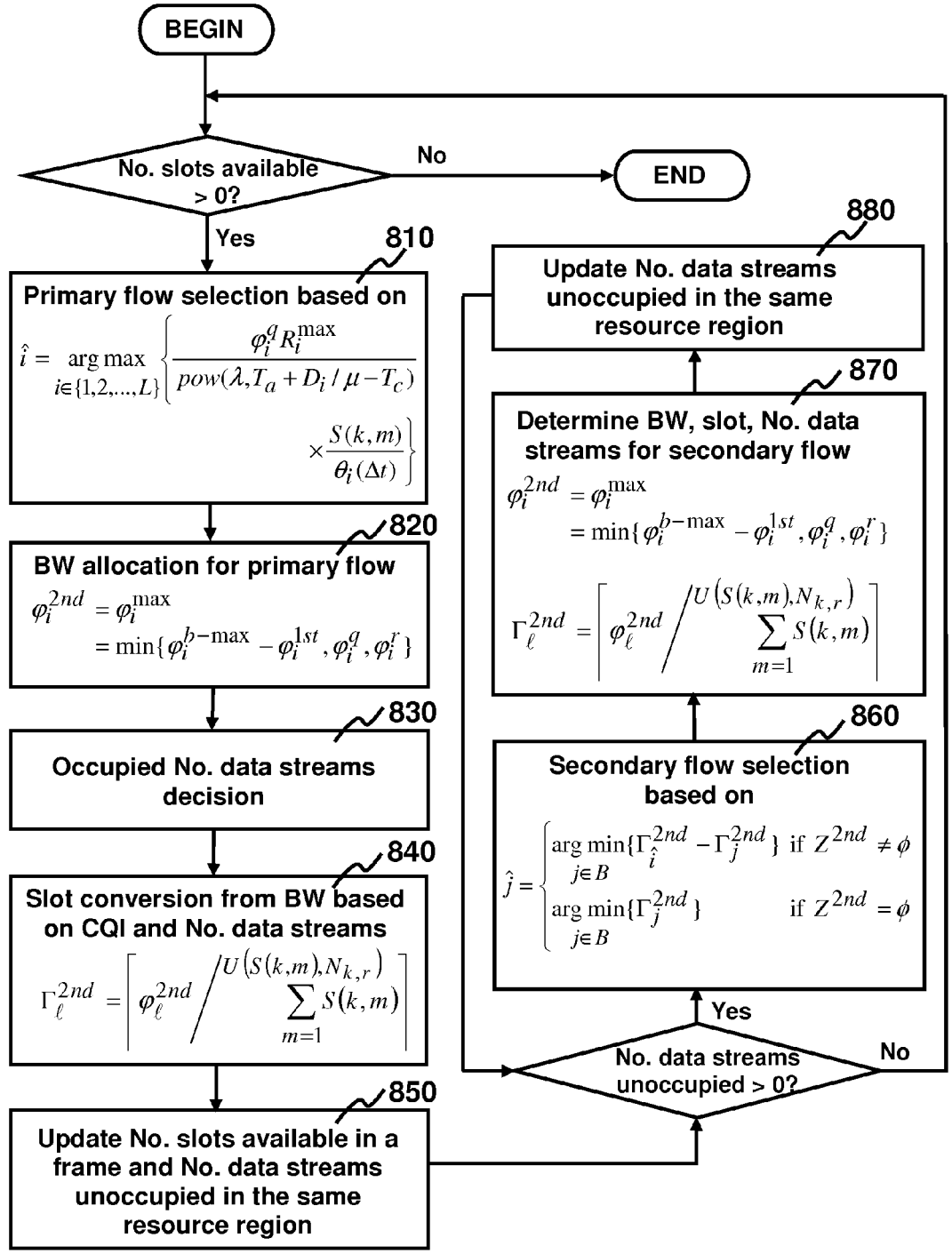
FIG. 8 depicts an example flowchart for scheduling rtPS flows in the second stage according to some embodiments of the present invention

FIG. 8 depicts an example flowchart for scheduling rtPS flows in the second stage of scheduling according to some embodiments of the present invention. For each radio frame, scheduling of a service is performed when free slots remain available by checking if the number of available slots is greater than zero. If there are one or more slots available in the radio frame, the service will be scheduled as follows.

First, a second primary flow is selected in the primary flow selection module 810 according to EQN. (7):

$$\hat{i} = \underset{i \in \{1,2,\ldots,L\}}{\operatorname{argmax}} \left\{ \frac{\varphi_i^q R_i^{max}}{pow(\lambda, T_a + D_i/\mu - T_c)} \times \frac{S(k,m)}{\theta_i(\Delta t)} \right\}.$$

After the second primary flow is determined, bandwidth allocation in accordance with $\phi_i^{2nd} = \phi_i^{max} = \min\{\phi_i^{b\text{-}max} - \phi_i^{1st}, \phi_i^r, \phi_i^q\}$ is performed for the second primary flow in a bandwidth allocation module 820. The number of occupied data streams is decided in an occupied data streams decision module 830. Based on the number of occupied data streams as well as the CQI, slot conversion from bandwidth is performed in a slot conversion module 840 according to EQN. (16):

$$\Gamma_\ell^{2nd} = \left\lceil \varphi_\ell^{2nd} / \sum_{m=1}^{U(S(k,m),N_{k,r})} S(k,m) \right\rceil.$$

Subsequently, in a first update module 850, both the number of slots available in a frame and the number of unoccupied data streams in the same resource region are updated.

As long as there remains one or more unoccupied data streams in the same resource region by checking if the number of the unoccupied data streams is greater than zero, a second secondary flow is selected in the secondary flow selection module 860 according to EQN. (12):

$$\hat{j} = \begin{cases} \underset{j \in B}{\arg\min}\{\Gamma_i^{2nd} - \Gamma_j^{2nd}\} & \text{if } Z^{2nd} \neq \phi \\ \underset{j \in B}{\arg\min}\{\Gamma_j^{2nd}\} & \text{if } Z^{2nd} = \phi. \end{cases}$$

For each second secondary flow, bandwidth allocation is performed according to $\phi_i^{2nd} = \phi_i^{max} = \min\{\phi_i^{b-max} - \phi_i^{1st}, \phi_i^r, \phi_i^q\}$ and slot allocation is performed according to EQN. (16), $$\Gamma_\ell^{2nd} = \left\lfloor \varphi_\ell^{2nd} \middle/ \sum_{m=1}^{U(S(k,m),N_{k,r})} S(k,m) \right\rfloor,$$

and the number of data streams to be occupied is determined in a processing module 870. Subsequently, in a second update module 880, the number of unoccupied data streams in the same resource region is updated. After updating, if unoccupied data streams still remain, the secondary flow selection is repeated along with bandwidth allocation as well as slot allocation for the secondary flow.

When no more unoccupied data streams are available, the whole process starting from the primary flow selection 810 is repeated unless there are no more slots available.

Figure 9:
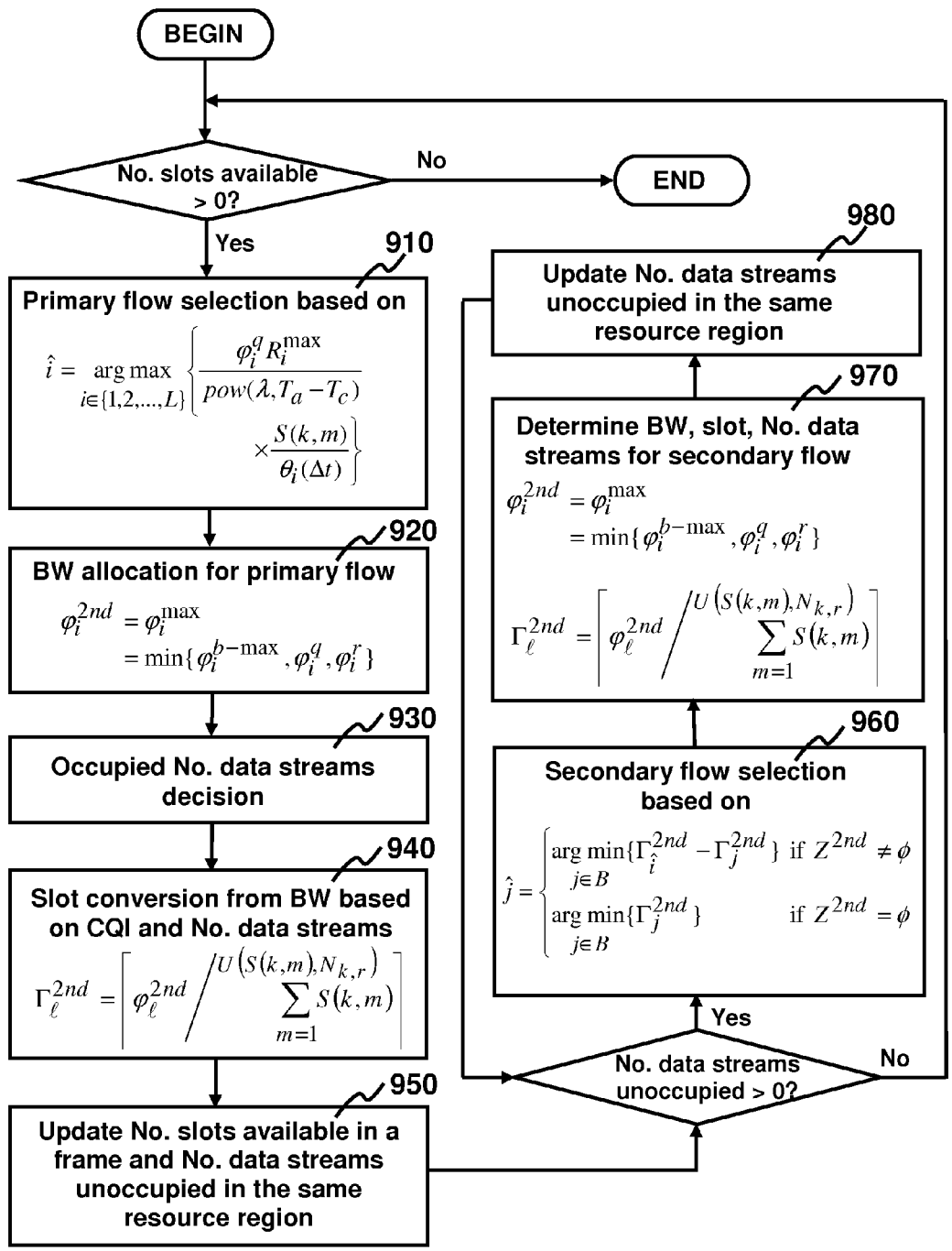
FIG. 9 depicts an example flowchart for scheduling BE flows in the second stage according to some embodiments of the present invention.

FIG. 9 depicts an example flowchart for scheduling BE flows in the second stage of scheduling according to some embodiments of the present invention.

For each radio frame, scheduling of a service is performed when free slots remain available by checking if the number of available slots is greater than zero. If there are one or more slots available in the radio frame, the service will be scheduled as follows.

First, a second primary flow is selected in the primary flow selection module 910 according to EQN. (9):

$$\hat{i} = \underset{i \in \{1,2,\ldots,L\}}{\arg\max} \left\{ \frac{\varphi_i^q R_i^{max}}{pow(\lambda, T_a - T_c)} \times \frac{S(k,m)}{\theta_i(\Delta t)} \right\}.$$

After the second primary flow is determined, bandwidth allocation in accordance with $\phi_i^{2nd} = \phi_i^{max} = \min\{\phi_i^{b-max}, \phi_i^r, \phi_i^q\}$ is performed for the second primary flow in a bandwidth allocation module 920. The number of occupied data streams is decided in an occupied data streams decision module 930. Based on the number of occupied data streams as well as the CQI, slot conversion from bandwidth is performed in a slot conversion module 940 according to the EQN. (16):

$$\Gamma_\ell^{2nd} = \left\lfloor \varphi_\ell^{2nd} \middle/ \sum_{m=1}^{U(S(k,m),N_{k,r})} S(k,m) \right\rfloor.$$

Subsequently, in a first update module 950, both the number of slots available in a frame and the number of unoccupied data streams in the same resource region are updated.

As long as there remains one or more unoccupied data streams in the same resource region by checking if the number of the unoccupied data streams is greater than zero, a second secondary flow is selected in the secondary flow selection module 960 according to EQN. (12):

$$\hat{j} = \begin{cases} \underset{j \in B}{\arg\min}\{\Gamma_i^{2nd} - \Gamma_j^{2nd}\} & \text{if } Z^{2nd} \neq \phi \\ \underset{j \in B}{\arg\min}\{\Gamma_j^{2nd}\} & \text{if } Z^{2nd} \neq \phi. \end{cases}$$

For each second secondary flow, bandwidth allocation is performed according to $\phi_i^{2nd} = \phi_i^{max} = \min\{\phi_i^{b-max}, \phi_i^r, \phi_i^q\}$ and slot allocation is performed according to EQN. (16), $$\Gamma_\ell^{2nd} = \left\lfloor \varphi_\ell^{2nd} \middle/ \sum_{m=1}^{U(S(k,m),N_{k,r})} S(k,m) \right\rfloor,$$

and the number of data streams to be occupied is determined in a processing module 970. Subsequently, in a second update module 980, the number of unoccupied data streams in the same resource region is updated. After updating, if unoccupied data streams remain, the secondary flow selection is repeated along with bandwidth allocation as well as slot allocation for the secondary flow.

When no more unoccupied data streams are available, the whole process starting from the primary flow selection 910 is repeated unless there are no more slots available.

Apparatus Implementation

Embodiments of the present invention may be implemented in the form of software, hardware, application logic or a combination of software, hardware and application logic. The software, application logic and/or hardware may reside on integrated circuit chips, modules or memories. If desired, part of the software, hardware and/or application logic may reside on integrated circuit chips, part of the software, hardware and/or application logic may reside on modules, and part of the software, hardware and/or application logic may reside on memories. In one exemplary embodiment, the application logic, software or an instruction set is maintained on any one of various conventional non-transitory computer-readable media.

Processes and logic flows which are described in this specification can be performed by one or more programmable processors executing one or more computer programs to perform functions by operating on input data and generating output. Processes and logic flows can also be performed by special purpose logic circuitry, e.g., an FPGA (field programmable gate array) or an ASIC (application-specific integrated circuit).

Apparatus or devices which are described in this specification can be implemented by a programmable processor, a computer, a system on a chip, or combinations of them, by operating on input date and generating output. Apparatus or devices can include special purpose logic circuitry, e.g., an FPGA (field programmable gate array) or an ASIC (application-specific integrated circuit). Apparatus or devices can also include, in addition to hardware, code that creates an execution environment for computer program, e.g., code that constitutes processor firmware, a protocol stack, a database management system, an operating system, a cross-platform runtime environment, e.g., a virtual machine, or a combination of one or more of them.

Processors suitable for the execution of a computer program include, for example, both general and special purpose microprocessors, and any one or more processors of any kind of digital computer. Generally, a processor will receive instructions and data from a read-only memory or a random access memory or both. The elements of a computer generally include a processor for performing or executing instructions, and one or more memory devices for storing instructions and data.

Computer-readable medium as described in this specification may be any media or means that can contain, store, communicate, propagate or transport the instructions for use by or in connection with an instruction execution system, apparatus, or device, such as a computer. A computer-readable medium may comprise a computer-readable storage medium that may be any media or means that can contain or store the instructions for use by or in connection with an instruction execution system, apparatus, or device, such as a computer. Computer-readable media may include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

A computer program (also known as, e.g., a program, software, software application, script, or code) can be written in any programming language, including compiled or interpreted languages, declarative or procedural languages, and it can be deployed in any form, including as a stand-alone program or as a module, component, subroutine, object, or other unit suitable for use in a computing environment. A computer program can be deployed to be executed on one computer or on multiple computers that are located at one single site or distributed across multiple sites and interconnected by a communication network.

Embodiments and/or features as described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with one embodiment as described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The whole specification contains many specific implementation details. These specific implementation details are not meant to be construed as limitations on the scope of the invention or of what may be claimed, but rather as descriptions of features specific to particular embodiments of the invention.

Certain features that are described in the context of separate embodiments can also be combined and implemented as a single embodiment. Conversely, various features that are described in the context of a single embodiment can also be implemented in multiple embodiments separately or in any suitable subcombinations. Moreover, although features may be described as acting in certain combinations and even initially claimed as such, one or more features from a combination as described or a claimed combination can in certain cases be excluded from the combination, and the claimed combination may be directed to a subcombination or variation of a subcombination. Although various aspects of the invention are set out in the independent claims, other aspects of the invention comprise other combinations of features from the embodiments and/or from the dependent claims with the features of the independent claims, and not solely the combinations explicitly set out in the claims.

Certain functions which are described in this specification may be performed in a different order and/or concurrently with each other. Furthermore, if desired, one or more of the above-described functions may be optional or may be combined.

The above descriptions provide exemplary embodiments of the present invention, but should not be viewed in a limiting sense. Rather, it is possible to make variations and modifications without departing from the scope of the present invention as defined in the appended claims.

The present invention may be implemented using general purpose or specialized computers or microprocessors programmed according to the teachings of the present disclosure. Computer instructions or software codes running in the general purpose or specialized computers or microprocessors can readily be prepared by practitioners skilled in the software art based on the teachings of the present disclosure.

In some embodiments, the present invention includes a computer storage medium having computer instructions or software codes stored therein which can be used to program a computer or microprocessor to perform any of the processes of the present invention. The storage medium can include, but is not limited to, floppy disks, optical discs, Blu-ray Disc, DVD, CD-ROMs, and magneto-optical disks, ROMs, RAMs, flash memory devices, or any type of media or device suitable for storing instructions, codes, and/or data.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A method for scheduling radio resources among service flows for services supported in a multi-input multi-output orthogonal frequency division multiplexing (MIMO-OFDM) wireless communication system, the resources comprising one or more spatial division multiple access (SDMA) regions, the supported services comprising one or more of adaptive Granting and Polling service (aGP), Best Effort service (BE), non-real-time Polling Service (nrtPS), real-time Polling Service (rtPS), Unsolicited Grant Service (UGS) and extended real-time Polling Service (ertPS), each of the supported services having a plurality of service flows, the scheduling method comprising:
  a first stage of scheduling for a first set of services that are the supported services selected from UGS, ertPS, aGP, rtPS and nrtPS; and
  a second stage of scheduling for a second set of services that are the supported services selected from aGP, rtPS, nrtPS and BE when there is any resource remaining available after the first stage of scheduling;
wherein the first stage of scheduling comprises resource scheduling for each of the supported services in the first service set, the resource scheduling for a service in the first service set comprising:

selecting a first primary flow from the service flows for said service in the first service set when there is any resource remaining available, wherein the selecting of the first primary flow includes prioritizing the service flows of said service in the first service set;

determining a portion of the resources for allocating to the first primary flow selected for said service in the first service set such that a requirement of supporting a minimum data rate for the first primary flow is guaranteed unless resources available are not sufficient to guarantee this requirement;

selecting one or more first secondary flows from the service flows of said service in the first service set when there is any resource remaining available, wherein the one or more first secondary flows are selected so as to optimize spectrum efficiency when transmitting with the first primary flow in a same SDMA region; and determining a portion of the resources for allocating to each of the one or more first secondary flows selected for said service in the first service set such that a requirement of supporting a minimum data rate for each of the one or more first secondary flows is guaranteed unless resources available are not sufficient to guarantee this requirement; and wherein the second stage of scheduling comprises resource scheduling for each of the supported services in the second service set, the resource scheduling for a service in the second service set comprising:

selecting a second primary flow from the service flows for said service in the second service set when there is any resource remaining available, wherein the selecting of the second primary flow includes prioritizing the service flows of said service in the second service set;

determining a portion of the resources for allocating to the second primary flow selected for said service in the second service set such that a requirement of not exceeding a maximum data rate for the second primary flow is satisfied;

selecting one or more second secondary flows from the service flows of said service in the second service set when there is any resource remaining available, wherein the one or more second secondary flows are selected so as to optimize spectrum efficiency when transmitting with the second primary flow in a same SDMA region; and determining a portion of the resources for allocating to each of the one or more second secondary flows selected for said service in the second service set such that a requirement of not exceeding a maximum data rate for each of the one or more second secondary flows is satisfied.

2. The scheduling method of claim 1, wherein a portion of the resources for allocating to a service flow is expressed as a bandwidth in unit of bytes or as a number of slots.

3. The scheduling method of claim 2, wherein the first primary flow is selected to be an $\hat{i}$ th service flow of said service in the first service set according to:

$$\hat{i} = \underset{i \in \{1,2,\ldots,L\}}{\arg\max} \left\{ \frac{\varphi_i^q R_i^{min}}{pow(\lambda, T_a + D_i/\mu - T_c)} \times \frac{S(k,m)}{\theta_i(\Delta t)} \right\}$$

or

-continued $$\hat{i} = \underset{i \in \{1,2,\ldots,L\}}{\arg\max} \left\{ \frac{\varphi_i^q R_i^{min}}{pow(\lambda, T_a + D_i/\mu - T_c)} \times \frac{1}{\theta_i(\Delta t)} \right\}$$

when said service in the first service set is UGS, ertPS, aGP or rtPS; and $$\hat{i} = \underset{i \in \{1,2,\ldots,L\}}{\arg\max} \left\{ \frac{\varphi_i^q R_i^{min}}{pow(\lambda, T_a - T_c)} \times \frac{S(k,m)}{\theta_i(\Delta t)} \right\}$$

or $$\hat{i} = \underset{i \in \{1,2,\ldots,L\}}{\arg\max} \left\{ \frac{\varphi_i^q R_i^{min}}{pow(\lambda, T_a - T_c)} \times \frac{1}{\theta_i(\Delta t)} \right\}$$

when said service in the first service set is nrtPS;
where symbols in the above formulas for computing $\hat{i}$ are defined in the specification.

4. The scheduling method of claim 3, wherein the bandwidth allocated to the first primary flow or any of the first secondary flows selected for said service in the first service set is $\phi_l^{1st}$, a bandwidth allocated to an l th service flow of said service in the first service set, according to:

$$\varphi_\ell^{1st} = \begin{cases} 0 & \text{if time out} \\ \min\{\varphi_\ell^{b-min}, \varphi_\ell^q, \varphi_\ell^r\} & \text{otherwise} \end{cases}$$

when said service in the first service set is UGS, ertPS, aGP or rtPS; and $$\phi_l^{1st} = \min\{\phi_l^{b-min}, \phi_l^q, \phi_l^r\}$$

when said service in the first service set is nrtPS;
where symbols in the above formulas for computing $\phi_l^{1st}$ are defined in the specification.

5. The scheduling method of claim 4, wherein the number of slots allocated to the first primary flow or any of the first secondary flows selected for said service in the first service set is $\Gamma_l^{1st}$, a number of slots allocated to the l th service flow, according to $$\Gamma_\ell^{1st} = \left\lceil \varphi_\ell^{1st} / \sum_{m=1}^{U(S(k,m),N_k,r)} S(k,m) \right\rceil$$

where symbols in the above formula for computing $\Gamma_l^{1st}$ are defined in the specification.

6. The scheduling method of claim 5, wherein the selecting of the one or more first secondary flows comprises:

forming a set $Z^{1st}=\{j|\Gamma_{\hat{i}}^{1st} \geq \Gamma_j^{1st}, j \in A\}$ in which A is a set of service-flow indices corresponding to service flows that are candidates for being selected as a first secondary flow;

selecting a $\hat{j}$ th service flow as a first secondary flow according to $$\hat{j} = \begin{cases} \underset{j \in A}{\arg\min}\{\Gamma_{\hat{i}}^{1st} - \Gamma_j^{1st}\} & \text{if } Z^{1st} \neq \phi \\ \underset{j \in A}{\arg\min}\{\Gamma_j^{1st}\} & \text{if } Z^{1st} = \phi; \end{cases}$$

updating A by removing the service-flow index $\hat{j}$ therein; and repeating the above steps for selecting another first secondary flow when there is any supportable data stream remaining available in the SDMA region.

7. The scheduling method of claim 6, wherein the second primary flow is selected to be an $\hat{i}$ service flow of said service in the second service set according to:

$$\hat{i} = \underset{i \in \{1,2,\ldots,L\}}{\arg\max} \left\{ \frac{\varphi_i^q R_i^{max}}{pow(\lambda, T_a + D_i/\mu - T_c)} \times \frac{S(k,m)}{\theta_i(\Delta t)} \right\}$$

or $$\hat{i} = \underset{i \in \{1,2,\ldots,L\}}{\arg\max} \left\{ \frac{\varphi_i^q R_i^{max}}{pow(\lambda, T_a + D_i/\mu - T_c)} \times \frac{1}{\theta_i(\Delta t)} \right\}$$

when said service in the second service set is aGP or rtPS; and $$\hat{i} = \underset{i \in \{1,2,\ldots,L\}}{\arg\max} \left\{ \frac{\varphi_i^q R_i^{max}}{pow(\lambda, T_a - T_c)} \times \frac{S(k,m)}{\theta_i(\Delta t)} \right\}$$

or $$\hat{i} = \underset{i \in \{1,2,\ldots,L\}}{\arg\max} \left\{ \frac{\varphi_i^q R_i^{max}}{pow(\lambda, T_a - T_c)} \times \frac{1}{\theta_i(\Delta t)} \right\}$$

when said service in the second service set is nrtPS or BE; where symbols in the above formulas for computing $\hat{i}$ are defined in the specification.

8. The scheduling method of claim 7, wherein the bandwidth allocated to the second primary flow or any of the second secondary flows selected for said service in the second service set is $\phi_l^{2nd}$, a bandwidth allocated to an l th service flow of said service in the second service set, according to:

$$\varphi_l^{2nd} = \begin{cases} 0 & \text{if time out} \\ 0 & \text{if not time out and if } R_l^{min} = R_l^{max} \\ \min\{\varphi_l^{b-max} - \varphi_l^{1st}, \varphi_l^q, \varphi_l^r\} & \text{if not time out and if } R_l^{min} \neq R_l^{max} \end{cases}$$

when said service in the second service set is aGP;

$$\varphi_l^{2nd} = \begin{cases} 0 & \text{if time out} \\ \min\{\varphi_l^{b-max} - \varphi_l^{1st}, \varphi_l^q, \varphi_l^r\} & \text{otherwise} \end{cases}$$

when said service in the second service set is rtPS;

$$\phi_l^{2nd} = \min\{\phi_l^{b-max} - \phi_l^{1st}, \phi_l^q, \phi_l^r\}$$

said service in the second service set is nrtPS; and $$\phi_l^{2nd} = \min\{\phi_l^{b-max}, \phi_l^q, \phi_l^r\}$$

when said service in the second service set is BE; where symbols in the above formulas for computing $\phi_l^{2nd}$ are defined in the specification.

9. The scheduling method of claim 8, wherein the number of slots allocated to the second primary flow or any of the second secondary flows selected for said service in the second service set is $\Gamma_l^{2nd}$, a number of slots allocated to the l th service flow, according to $$\Gamma_l^{2nd} = \left\lceil \varphi_l^{2nd} \bigg/ \sum_{m=1}^{U(S(k,m),N_{k,r})} S(k,m) \right\rceil$$

where symbols in the above formula for computing $\Gamma_l^{2nd}$ are defined in the specification.

10. The scheduling method of claim 9, wherein the selecting of the one or more second secondary flows comprises:
forming a set $Z^{2nd} = \{j | \Gamma_i^{2nd}, j \in B\}$ in which B is a set of service-flow indices corresponding to service flows that are candidates for being selected as a second secondary flow;
selecting a $\hat{j}$ th service flow as a second secondary flow according to $$\hat{j} = \begin{cases} \underset{j \in B}{\arg\min}\{\Gamma_i^{2nd} - \Gamma_j^{2nd}\} & \text{if } Z^{2nd} \neq \phi \\ \underset{j \in B}{\arg\min}\{\Gamma_j^{2nd}\} & \text{if } Z^{2nd} = \phi; \end{cases}$$

updating B by removing the service-flow index $\hat{j}$ therein; and repeating the above steps for selecting another second secondary flow when there is any supportable data stream remaining available in the SDMA region.

11. An apparatus comprising one or more processors configured to schedule radio resources among service flows for services supported in a multi-input multi-output orthogonal frequency division multiplexing (MIMO-OFDM) wireless communication system according to the scheduling method of claim 1.

12. An apparatus comprising one or more processors configured to schedule radio resources among service flows for services supported in a multi-input multi-output orthogonal frequency division multiplexing (MIMO-OFDM) wireless communication system according to the scheduling method of claim 2.

13. An apparatus comprising one or more processors configured to schedule radio resources among service flows for services supported in a multi-input multi-output orthogonal frequency division multiplexing (MIMO-OFDM) wireless communication system according to the scheduling method of claim 3.

14. An apparatus comprising one or more processors configured to schedule radio resources among service flows for services supported in a multi-input multi-output orthogonal frequency division multiplexing (MIMO-OFDM) wireless communication system according to the scheduling method of claim 4.

15. An apparatus comprising one or more processors configured to schedule radio resources among service flows for services supported in a multi-input multi-output orthogonal frequency division multiplexing (MIMO-OFDM) wireless communication system according to the scheduling method of claim 5.

16. An apparatus comprising one or more processors configured to schedule radio resources among service flows for services supported in a multi-input multi-output orthogonal frequency division multiplexing (MIMO-OFDM) wireless communication system according to the scheduling method of claim 6.

17. An apparatus comprising one or more processors configured to schedule radio resources among service flows for services supported in a multi-input multi-output orthogonal frequency division multiplexing (MIMO-OFDM) wireless communication system according to the scheduling method of claim 7.

18. An apparatus comprising one or more processors configured to schedule radio resources among service flows for services supported in a multi-input multi-output orthogonal frequency division multiplexing (MIMO-OFDM) wireless communication system according to the scheduling method of claim 8.

19. An apparatus comprising one or more processors configured to schedule radio resources among service flows for services supported in a multi-input multi-output orthogonal frequency division multiplexing (MIMO-OFDM) wireless communication system according to the scheduling method of claim 9.

20. An apparatus comprising one or more processors configured to schedule radio resources among service flows for services supported in a multi-input multi-output orthogonal frequency division multiplexing (MIMO-OFDM) wireless communication system according to the scheduling method of claim 10.

\* \* \* \* \*